(12) United States Patent
Kim et al.

(10) Patent No.: US 9,967,905 B2
(45) Date of Patent: May 8, 2018

(54) METHOD AND DEVICE FOR CANCELLING DEVICE TRIGGER IN WIRELESS COMMUNICATION SYSTEM

(71) Applicant: LG ELECTRONICS INC., Seoul (KR)

(72) Inventors: Laeyoung Kim, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/906,519

(22) PCT Filed: Aug. 18, 2014

(86) PCT No.: PCT/KR2014/007616
§ 371 (c)(1),
(2) Date: Jan. 20, 2016

(87) PCT Pub. No.: WO2015/026109
PCT Pub. Date: Feb. 26, 2015

(65) Prior Publication Data
US 2016/0157276 A1     Jun. 2, 2016

Related U.S. Application Data

(60) Provisional application No. 61/867,139, filed on Aug. 18, 2013.

(51) Int. Cl.
*H04W 72/00*     (2009.01)
*H04W 76/02*     (2009.01)
(Continued)

(52) U.S. Cl.
CPC .......... *H04W 76/02* (2013.01); *H04W 4/005* (2013.01); *H04W 76/027* (2013.01); *H04W 76/06* (2013.01); *H04W 4/14* (2013.01)

(58) Field of Classification Search
CPC ... H04W 76/02; H04W 4/005; H04W 76/027; H04W 76/06; H04W 4/14
See application file for complete search history.

(56) References Cited

U.S. PATENT DOCUMENTS

2012/0257571 A1   10/2012   Liao
2013/0013741 A1   1/2013    Norp et al.
(Continued)

FOREIGN PATENT DOCUMENTS

| EP | 2416604 | 2/2012 |
| KR | 10-2013-0007190 | 1/2013 |
| WO | 2013/114504 | 8/2013 |

OTHER PUBLICATIONS

PCT International Application No. PCT/KR2014/007616, Written Opinion of the International Searching Authority dated Nov. 27, 2014, 23 pages.

*Primary Examiner* — Barry W Taylor
(74) *Attorney, Agent, or Firm* — Lee Hong Degerman Kang Waimey

(57) ABSTRACT

The present invention relates to a wireless communication system, and more particularly, to a method and a device for cancelling a device trigger. The method for cancelling a device trigger in a wireless communication system, according to one embodiment of the present invention, can comprise the steps of: receiving a cancellation request for a first trigger message in a network node; and transmitting a second trigger message to the terminal if the first trigger message has been transmitted to the terminal and the cancellation request indicates a replacement request. The second trigger message can include information which indicates that the cancellation of the first trigger message has been requested.

11 Claims, 16 Drawing Sheets

(51) Int. Cl.
*H04W 76/06* (2009.01)
*H04W 4/00* (2018.01)
*H04W 4/14* (2009.01)

(56) References Cited

U.S. PATENT DOCUMENTS

2015/0181564 A1* 6/2015 Rao .................. H04W 24/04
 370/329
2015/0195718 A1* 7/2015 Jain .................. H04W 4/005
 370/328

* cited by examiner

METHOD AND DEVICE FOR CANCELLING DEVICE TRIGGER IN WIRELESS COMMUNICATION SYSTEM

CROSS-REFERENCE TO RELATED APPLICATIONS

This application is the National Stage filing under 35 U.S.C. 371 of International Application No. PCT/KR2014/007616, filed on Aug. 18, 2014, which claims the benefit of U.S. Provisional Application No. 61/867,139, filed on Aug. 18, 2013, the contents of which are all hereby incorporated by reference herein in their entirety.

TECHNICAL FIELD

The present invention relates to a wireless communication system, and more particularly, to a method and device for cancelling a device trigger.

BACKGROUND ART

MTC (Machine Type Communications) refers to a communication scheme involving one or more machines. MTC is also called Machine-to-Machine (M2M) communication or Internet of Things (IoT). A machine is an entity that does not need direct human manipulation or intervention. For example, a user device such as a smartphone that can be automatically connected to a network and perform communication without a user's manipulation/intervention as well as a meter or automatic vending machine equipped with a mobile communication module may be an example of the machine. Such various exemplary machines will be referred to as MTC devices or User Equipments (UEs) in the present disclosure. That is, MTC means communication performed by one or more machines (i.e., MTC devices) without human manipulation/intervention.

MTC may cover communication between MTC devices (e.g., Device-to-Device (D2D) communication) and communication between an MTC device and an MTC application server. For example, communication between an MTC device and an MTC application server may be communication between an automatic vending machine and a server, communication between a Point Of Sale (POS) device and a server, and communication between an electricity, gas, or water meter and a server. In addition, MTC-based applications may include security, transportation, health care, etc.

An MTC device may establish connection in accordance with a request or command in a state that it is on standby without establishing connection for data transmission and reception to minimize power consumption. This request or command may be referred to as an MTC device triggering message.

DISCLOSURE

Technical Problem

An object of the present invention is to provide a solution for preventing an unnecessary operation or error operation caused by cancellation of an MTC triggering message from occurring in an MTC device.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to one embodiment of the present invention to solve the aforementioned technical problem, a method for cancelling a device trigger in a wireless communication system comprises the steps of receiving a cancellation request for a first trigger message in a network node; checking whether the first trigger message has been transmitted to a user equipment or is pending in the network node; and transmitting a second trigger message to the user equipment if the first trigger message has been transmitted to the user equipment and the cancellation request indicates a replace request. The second trigger message may include information which indicates that the cancellation of the first trigger message has been requested.

According to another embodiment of the present invention to solve the aforementioned technical problem, a method for cancelling a device trigger in a wireless communication system comprises the steps of receiving a first trigger message from a network node; receiving a new message, which includes information indicating that cancellation of the first trigger message has been requested, from the network node; and performing an operation according to cancellation of the first trigger message. The new message may be a second trigger message if the first trigger message has been transmitted from the network node to the user equipment and the cancellation request of the first trigger message received by the network node indicates a replace request. The new message may be a trigger cancel notification message if the first trigger message has been transmitted from the network node to the user equipment and the cancellation request of the first trigger message received by the network node indicates a recall request.

According to still another embodiment of the present invention to solve the aforementioned technical problem, a network node device for cancelling a device trigger in a wireless communication system comprises a transceiver; and a processor. The processor may be configured to receive a cancellation request of a first trigger message through the transceiver, check whether the first trigger message has been transmitted to a user equipment or is pending in the network node, and transmit a second trigger message to the user equipment through the transceiver if the first trigger message has been transmitted to the user equipment and the cancellation request indicates a replace request. The second trigger message may include information which indicates that the cancellation of the first trigger message has been requested.

According to further still another embodiment of the present invention to solve the aforementioned technical problem, a user equipment for cancelling a device trigger in a wireless communication system comprises a transceiver; and a processor. The processor may be configured to receive a first trigger message from a network node through the transceiver, receive a new message, which includes information indicating that cancellation of the first trigger message has been requested, from the network node through the transceiver, and perform an operation according to cancellation of the first trigger message. The new message may be a second trigger message if the first trigger message has been transmitted from the network node to the user equipment and the cancellation request of the first trigger message received by the network node indicates a replace request. The new message may be a trigger cancel notification message if the first trigger message has been transmitted from the network node to the user equipment and the cancellation request of the first trigger message received by the network node indicates a recall request.

Followings may be applied to the embodiments of the present invention.

The second trigger message may further include information indicating an operation performed by the user equipment in accordance with cancellation of the first trigger message.

The operation performed by the user equipment in accordance with cancellation of the first trigger message may include one or more of cancellation of a task or reserved task based on the first trigger message, cancellation of connection to a network based on the first trigger message, and cancellation of data transmission to a network based on the first trigger message.

The second trigger message may be transmitted to the user equipment in the case that the first trigger message is successfully delivered to the user equipment, the first trigger message is transmitted to the user equipment regardless of successful delivery of the first trigger message to the user equipment, or the first trigger message is successfully delivered to the user equipment or the network node does not know whether the first trigger message has been transmitted to the user equipment but successfully delivered to the user equipment.

If the first trigger message has been transmitted to the user equipment and the cancellation request indicates a recall request, a trigger cancel notification message may be transmitted to the user equipment, and may include information indicating that cancellation of the first trigger message has been requested.

The trigger cancel notification message may further include information indicating an operation performed by the user equipment in accordance with cancellation of the first trigger message.

The operation performed by the user equipment in accordance with cancellation of the first trigger message may include one or more of cancellation of a task or reserved task based on the first trigger message, cancellation of connection to a network based on the first trigger message, and cancellation of data transmission to a network based on the first trigger message.

The trigger cancel notification message may be transmitted to the user equipment in the case that the first trigger message is successfully delivered to the user equipment, the first trigger message is transmitted to the user equipment regardless of successful delivery of the first trigger message to the user equipment, or the first trigger message is successfully delivered to the user equipment or the network node does not know whether the first trigger message has been transmitted to the user equipment but successfully delivered to the user equipment.

If the first trigger message is pending in the network node or has been transmitted to the user equipment but not delivered to the user equipment successfully and the cancellation request indicates the replace request, the cancellation request may be considered as success and a new trigger message may be transmitted to the user equipment.

If the first trigger message is pending in the network node or has been transmitted to the user equipment but not delivered to the user equipment successfully and the cancellation request indicates the recall request, the cancellation request may be considered as success.

The network node may be a machine type communication-interworking function (MTC-IWF) or a short message service-service center (SMS-SC).

The cancellation request may be received from a services capability service/application server (SCS/AS).

The aforementioned description of the present invention and detailed description, which will be described later, are only exemplary, and are intended for additional description of the invention cited in claims.

Advantageous Effects

According to the present invention, a method and device for preventing an unnecessary operation or error operation caused by cancellation of an MTC triggering message from occurring in an MTC device can be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
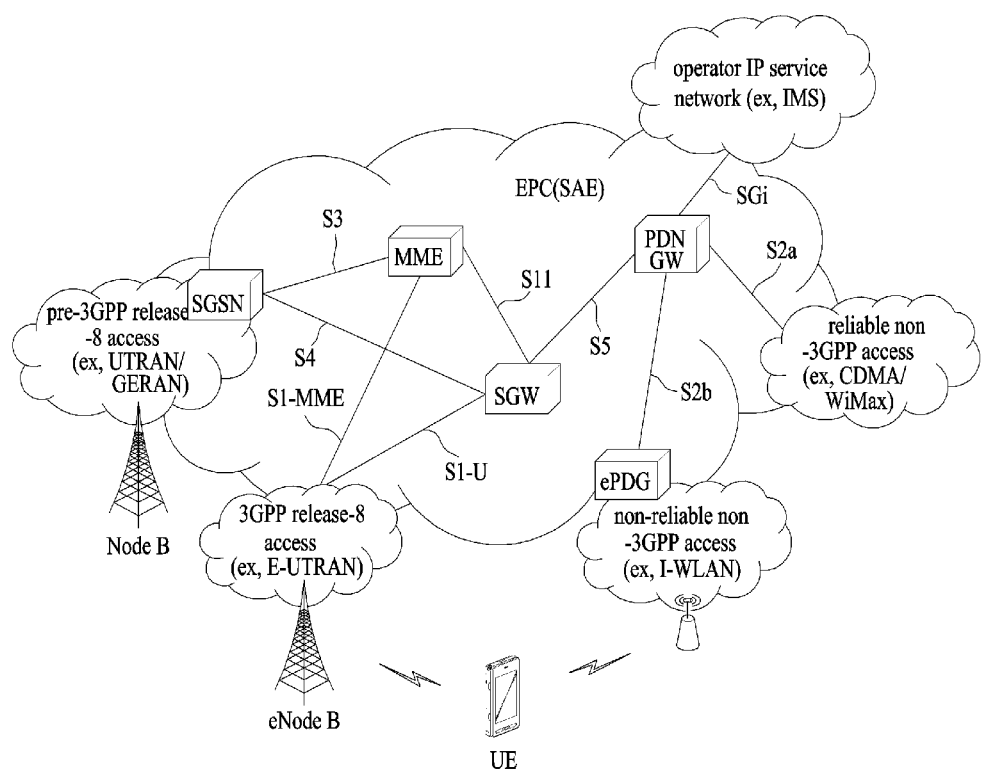
FIG. 1 is a diagram illustrating a brief structure of an Evolved Packet System (EPS) that includes an Evolved Packet Core (EPC)

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless communication systems. Although the following description will be made based on the 3GPP LTE and 3GPP LTE-A system for clarification, it is to be understood that the technical spirits of the present invention are not limited to the 3GPP LTE and 3GPP LTE-A system.

Terminologies used herein will be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC UE.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HS S can perform functions such as configuration storage, identity management, and user state storage.

PLMN (Public Land Mobile Network): a network configured for the purpose of providing mobile communication services to individuals. This network can be configured per operator.

MTC: communication conducted by a machine without human intervention.

MTC device: a UE for performing MTC. The MTC device can perform communication with MTC server(s) and/or another MTC device(s) through a PLMN. The MTC device may be referred to as an MTC UE, a UE used for MTC, a UE configured for MTC, etc.

MTC-IWF (MTC InterWorking Function): an entity that provides a gateway to transmit a control signal or data for MTC through a 3GPP network that includes an EPS or IMS. THE MTC-IWF may relay or translate a signaling protocol used on a Tsp reference point to invoke a specific function within a PLMN.

SCS (Service Capability Server): a server connected to a 3GPP network for communication between an MTC device located in a Home Public Land Mobile Network (HPLMN) and an MTC device that uses an MTC-InterWorking Function (MTC-IWF). The SCS provides capability of using one or more applications.

MTC server: a server on a network, which manages an MTC UE, and can perform communication with a PLMN, or can perform communication with an MTC device through a PLMN. The MTC server may have an interface that can be accessed by an MTC user. Also, the MTC server may provide other servers with MTC related service (format of SCS), or may be an MTC application server (AS).

MTC application: a service to which MTC is applied (e.g., remote metering, product movement tracking, etc.).

MTC application server: a server for executing an MTC application on a network.

MTC feature: a function of a network for supporting an MTC application. For example, MTC monitoring is a feature for preparing for equipment loss in an MTC application such as remote metering, and low mobility is a feature for an MTC application for an MTC device such as an automatic vending machine.

MTC user: a user who uses a service provided by an MTC server.

MTC subscriber: an entity connected to a network operator to provide services to one or more MTC UEs.

MTC group: a group of MTC UEs sharing one or more MTC features and belonging to an MTC subscriber.

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Figure 2:
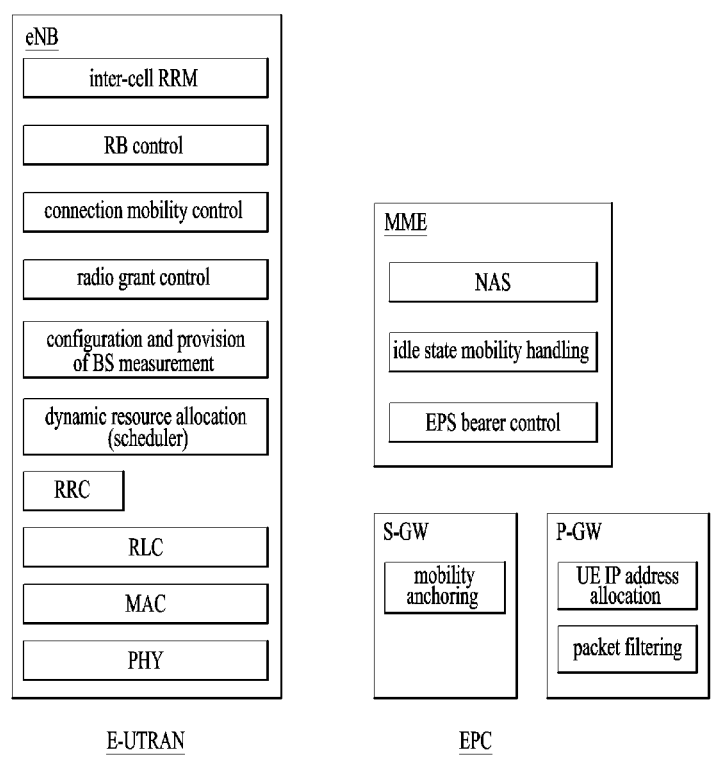
FIG. 2 is an exemplary diagram illustrating an architecture of a general E-UTRAN and a general EPC.

FIG. 2 is an exemplary diagram illustrating an architecture of a general E-UTRAN and EPC.

As shown, eNodeB may perform functions of routing toward a gateway during activation of Radio Resource Control (RRC) connection, scheduling and transmission of paging messages, scheduling and transmission of Broadcast Channel (BCH), dynamic allocation of resources to UE in both uplink and downlink, configuration and provisioning for eNodeB measurements, radio bearer control, radio admission control, and connection mobility control. In the EPC, the eNodeB may perform functions of paging occurrence, LTE-IDLE state management, ciphering of the user plane, System Architecture Evolution (SAE) bearer control, and ciphering and integrity protection of Non-Access Stratum (NAS) signaling.

Figure 3:
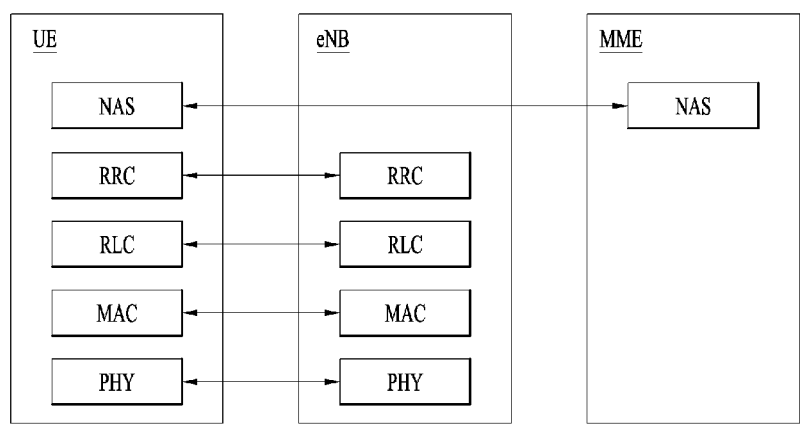
FIG. 3 is an exemplary diagram illustrating a structure of a radio interface protocol on a control plane.
Figure 4:
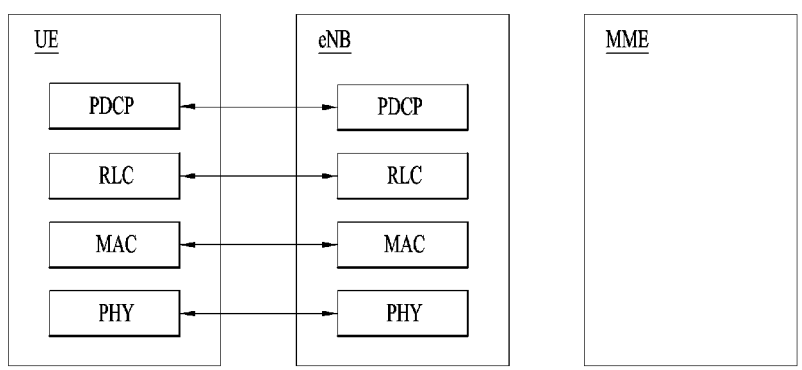
FIG. 4 is an exemplary diagram illustrating a structure of a radio interface protocol on a user plane.

FIG. 3 is an exemplary diagram illustrating a structure of a radio interface protocol on a control plane between a UE and a base station, and FIG. 4 is an exemplary diagram illustrating a structure of a radio interface protocol on a user plane between a UE and a base station.

The radio interface protocol is based on the 3GPP radio access network standard. The radio interface protocol horizontally includes a physical layer, a data link layer, and a network layer, and vertically includes a user plane for data information transfer and a control plane for signaling transfer (control signal transfer).

The protocol layers may be classified into L1 (first layer), L2 (second layer) and L3 (third layer) based on three lower layers of the open system interconnection (OSI) standard model widely known in the communications systems.

Hereinafter, each layer of the radio protocol on the control plane shown in FIG. 3 and the radio protocol on the user plane shown in FIG. 4 will be described.

The physical layer belonging to the first layer L1 provides an information transfer service using a physical channel. The physical layer is connected to a medium access control (MAC) layer above the physical layer via a transport channel. Data are transferred between the medium access control layer and the physical layer via the transport channel. And, data are transferred between different physical layers, that is, between one physical layer of a transmitting side and the other physical layer of a receiving side through the physical channel.

The physical channel includes a plurality of subframes on a time axis and a plurality of sub-carriers on a frequency axis. In this case, one subframe includes a plurality of symbols and a plurality of sub-carriers on a time axis. One subframe includes a plurality of resource blocks, each of which includes a plurality of symbols and a plurality of sub-carriers. A transmission time interval (TTI) which is unit time for transmitting data is 1 ms corresponding to one subframe.

The physical channels existing in the physical layers of the transmitting side and the receiving side may be classified into a physical downlink shared channel (PDSCH) and a physical uplink shared channel (PUSCH) which are data channels, and a physical downlink control channel (PDCCH), a physical control format indicator channel (PCFCH), a physical hybrid-ARQ indicator channel (PHICH) and a physical uplink control channel (PUCCH), which are control channel, in accordance with the 3GPP LTE.

Several layers exist in the second layer.

First of all, the MAC layer of the second layer serves to map various logical channels into various transport channels, and also serves as logical channel multiplexing for mapping several logical channels into one transport channel. The MAC layer is connected with a radio link control (RLC) layer through a logical channel, wherein the RLC layer is located above the MAC layer. The logical channel is divided into a control channel transmitting information of the control plane and a traffic channel transmitting information of the user plane depending on types of transmitted information.

The RLC layer of the second layer serves to perform segmentation and concatenation of data received from its upper layer to control a size of the data so that the lower layer transmits the data to a radio interval.

A packet data convergence protocol (PDCP) layer of the second layer performs a header compression function for reducing a size of an IP packet header having relatively great size and unnecessary control information to effectively transmit data using IP packets such as IPv4 or IPv6 within a radio-communication interval having a narrow bandwidth.

Also, in the LTE system, the PDCP layer performs a security function. The security function includes a ciphering function preventing the third party from performing data monitoring and an integrity protection function preventing the third party from performing data manipulation.

A radio resource control (RRC) layer located on the highest part of the third layer is defined in the control plane only and is associated with configuration, re-configuration and release of radio bearers (RBs) to be in charge of controlling the logical, transport and physical channels. In this case, the RB means a service provided by the second layer for the data transfer between the user equipment and the E-UTRAN.

If there is RRC connection between the RRC layer of the user equipment and the RRC layer of the E-UTRAN, the user equipment is in an RRC connected mode, and if not so, the user equipment is in an RRC idle mode.

Hereinafter, an RRC state of the UE and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state. Since the E-UTRAN may identify the presence of the user equipment which is in the RRC_CONNECTED state, on the basis of cell unit, the E-UTRAN may effectively control the user equipment. On the other hand, the E-UTRAN may not identify the user equipment which is in the RRC_IDLE state, on the basis of cell unit. In this case, the user equipment is managed by a core network (CN) on the basis of a tracking area (TA) unit which is a local unit greater than the cell unit. In other words, the presence of the user equipment which is in the RRC_IDLE state may be identified on the basis of a local unit greater than the cell unit, and in order that the user equipment which is in the RRC_IDLE state receives a general mobile communication service such as voice or data from the cell, the user equipment should be shifted to the RRC_CONNECTED state.

When the user initially turns on the power of the user equipment, the user equipment searches for a proper cell and then establishes RRC connection in the corresponding cell, and registers information of the user equipment in the core network. Afterwards, the user equipment is maintained in the RRC_IDLE state in the corresponding cell. The user equipment maintained in the RRC_IDLE state performs (re-)selects a cell if necessary and monitors system information or paging information. This will be referred to as camp on a cell. The user equipment maintained in the RRC_IDLE state establishes RRC connection with the RRC layer of the E-UTRAN through an RRC connection procedure only if the RRC connection is required, and then is shifted to the RRC_CONNECTED state. In this case, the case where the RRC connection is required may include a case where calling attempt or data transmission attempt of a user is required or a case where a response message to a paging message received from the E-UTRAN should be transmitted.

The NAS (Non-Access Stratum) layer located above the RRC layer serves to perform session management and mobility management.

The NAS layer shown in FIG. 3 will be described in detail as follows.

Evolved session management (eSM) which belongs to the NAS layer serves to perform default bearer management and dedicated bearer management to be in charge of controlling the user equipment to use a PS service from the network. The default bearer resource is allocated from the network during initial access to a specific packet data network (PDN). At this time, the network allocates an IP address, which may be used by the user equipment, to allow the user equipment to use a data service, and also allocates QoS of the default bearer. The LTE supports two kinds of bearers, that is, a bearer having a GBR (Guaranteed bit rate) QoS feature guaranteeing a specific bandwidth for data transmission and reception and a non-GBR bearer having the best effort QoS feature without guaranteeing a bandwidth. The default bearer is allocated with the non-GBR bearer. The dedicated bearer may be allocated with the bearer having QoS feature of GBR or non-GBR.

The bearer allocated from the network to the user equipment may be referred to as an evolved packet service (EPS) bearer, and the network allocates one ID when the EPS bearer is allocated. This ID will be referred to as EPS bearer ID. One EPS bearer has QoS feature of MBR (maximum bit rate) or/and GBR (guaranteed bit rate).

Figure 5:
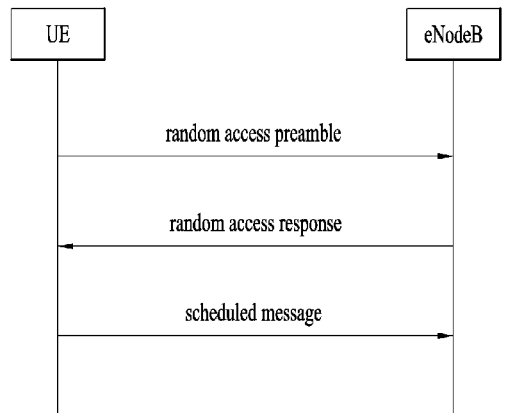
FIG. 5 is a flow chart illustrating a random access procedure.

FIG. 5 is a flow chart illustrating a random access procedure in the 3GPP LTE.

The random access procedure is used such that the UE obtains UL synchronization with the base station or is allocated with UL radio resource.

The UE receives a root index and a physical random access channel (PRACH) configuration index from the eNodeB. 64 candidate random access preambles defined by ZC (Zadoff-Chu) sequence exist per cell, and the root index is a logical index for allowing the UE to generate 64 candidate random access preambles.

Transmission of the random access preambles is limited to specific time and frequency resources per cell. The PRACH configuration index indicates a specific subframe and a specific preamble format, which enable transmission of the random access preambles.

The UE transmits a random access preamble, which is selected randomly, to the eNodeB. The UE selects one of the 64 candidate random access preambles, and selects a corresponding subframe by means of the PRACH configuration index. The UE transmits the selected random access preamble from the selected subframe.

The eNodeB that has received the random access preamble transits a random access response (RAR) to the UE. The random access response is detected by two stages. First of all, the UE detects a PDCCH masked with RA-RNTI (random access-RNTI). The UE receives a random access response within a MAC PDU (protocol data unit) on a PDSCH indicated by the detected PDCCH.

Figure 6:
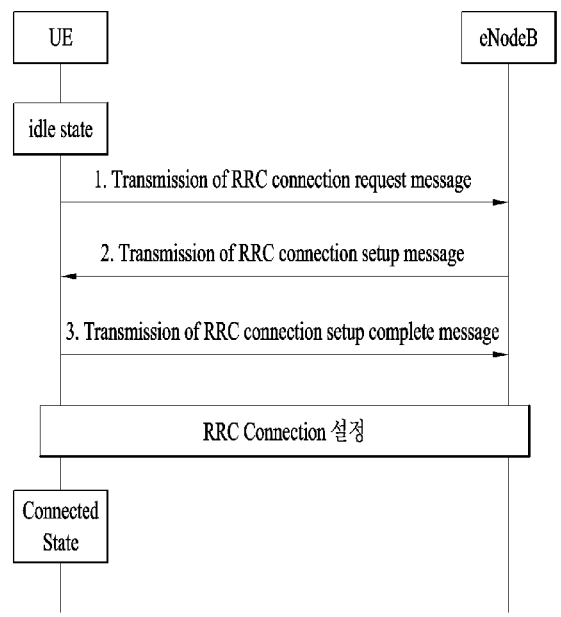
FIG. 6 is a diagram illustrating a connection procedure in a radio resource control (RRC) layer.

FIG. 6 is a diagram illustrating a connection procedure in a radio resource control (RRC) layer.

RRC state is shown in FIG. 6 in accordance with RRC connection. The RRC state means whether an entity of the RRC layer of the UE is logically connected with an entity of the RRC layer of the eNodeB. If the entity of the RRC layer of the UE is logically connected with the entity of the RRC layer of the eNodeB, it may be referred to as RRC connected state. If not so, it may be referred to as RRC idle state.

Since the E-UTRAN may identify the presence of the corresponding UE which is in the RRC connected state, on the basis of cell unit, the E-UTRAN may effectively control the UE. On the other hand, the E-UTRAN may not identify the user equipment which is in the RRC idle state, on the basis of cell unit. In this case, the UE is managed by a core network (CN) on the basis of a tracking area (TA) unit which is a local unit greater than the cell unit. In other words, the presence of the UE which is in the RRC idle state may be identified on the basis of a local unit greater than the cell unit, and in order that the UE which is in the RRC idle state receives a general mobile communication service such as voice or data from the cell, the UE should be shifted to the RRC connected state.

When the user initially turns on the power of the UE, the UE searches for a proper cell and then is maintained in the idle state in the corresponding cell. The UE maintained in the idle state establishes RRC connection with the RRC layer of the eNodeB through an RRC connection procedure when the RRC connection is required, and then is shifted to the RRC connected state.

In this case, the case where the RRC connection is required may include several cases, for example, a case where calling attempt of a user or uplink data transmission is required or a case where a response message to a paging message received from the E-UTRAN should be transmitted.

The UE of the idle state should perform the RRC connection procedure as described above to establish RRC connection with the eNodeB. The RRC connection procedure includes a procedure of transmitting an RRC connection request message from the UE to the eNodeB, a procedure of transmitting an RRC connection setup message from the eNodeB to the UE, and a procedure of transmitting an RRC connection setup complete message from the UE to the eNodeB. These procedures will be described in more detail with reference to FIG. 6.

1) The UE of the idle state first transmits an RRC connection request message to the eNodeB to establish RRC connection with the eNodeB due to reasons such as call attempt, data transmission attempt, or response to paging of the eNodeB.

2) If the RRC connection request message is received from the UE, the eNodeB accepts the RRC connection request of the UE in the case that there are sufficient radio resources, and transmits an RRC connection setup message to the UE as a response message.

3) If the RRC connection setup message is received, the UE transmits an RRC connection setup complete message to the eNodeB. If the UE successfully transmits the RRC connection setup message, the UE establishes RRC connection with the eNodeB and is shifted to an RRC connected mode.

MTC Structure

Figure 7:
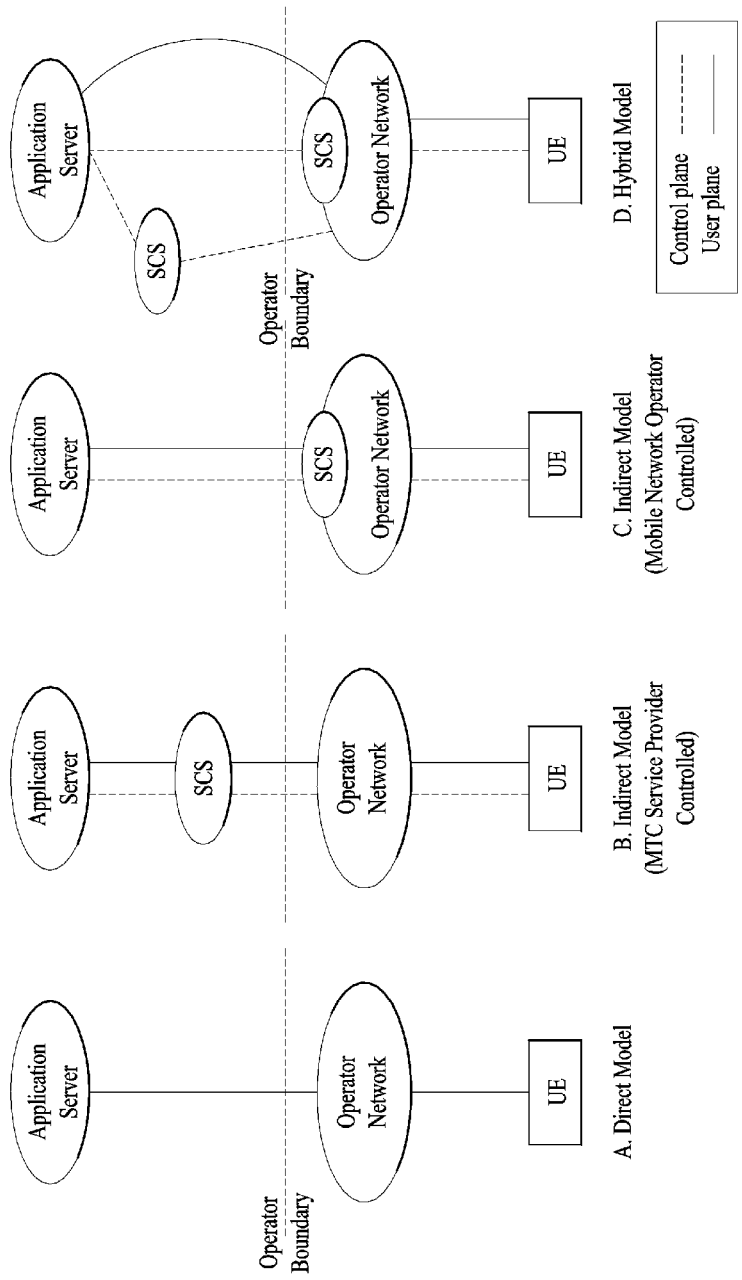
FIG. 7 is a diagram illustrating examples of MTC communication model.

FIG. 7 is a diagram illustrating examples of MTC communication model.

Although communication through a PS network in relation to MTC is defined in the 3GPP GSM/UMTS/EPS, the present invention is not limited to MTC through a PS network, and may be applied to MTC through a CS network. In the current technology standard, a network structure is defined using a conventional bearer of the 3GPP system. In this case, a method for using a short message service (SMS) for data exchange between an MTC device and an MTC server has been suggested. Considering that small capacity of digital data such as metering information and product information will be targets for SMS in view of features of MTC application, use of the most appropriate SMS has been suggested. As a detailed method for using SMS, a conventional SMS method and an IMS based SMS method can be supported. Also, methods for coordinating a paging range for MTC application having low mobility have been suggested.

MTC applications are executed in each of the MTC device and the MTC server (for example, SCS), and mutually interact through communication through a network. At this time, various models for MTC traffic can be implemented depending on communication between MTC application and a 3GPP network. FIG. 7(*a*) illustrates a model where direct communication is performed without MTC server (for example, SCS), FIG. 7(*b*) illustrates a model where an MTC server (for example, SCS) exists outside an operator domain, and FIG. 7(*c*) illustrates a model where an MTC server (for example, SCS) exists inside an operator domain. Also, FIG. 7(*a*) corresponds to a direct communication mode under the control of a 3GPP operator, FIG. 7(*b*) corresponds to a communication mode controlled by a service provider, and FIG. 7(*c*) corresponds to a communication mode controlled by a 3GPP operator.

The direct model of FIG. 7(*a*) illustrates that an MTC application performs direct communication with a UE (or MTC device) as an over-the-top (OTT) application with respect to the 3GPP network.

The indirect models of FIG. 7 (*b*) and FIG. 7(*c*) illustrate that an MTC application performs indirect communication with a UE (or MTC device) by using additional services provided by the 3GPP network. In more detail, in the example of FIG. 7(*b*), the MTC application may use the MTC server (for example, SCS) for additional services provided by a third party (that is, which is not responsible for 3GPP) service provider. The MTC server (for example, SCS) can perform communication with the 3GPP network through various interfaces. Meanwhile, in the example of FIG. 7(*c*), the MTC application may use the MTC server (for example, SCS) for additional services provided by the 3GPP operator (that is, corresponding to service provider). Communication between the MTC server (for example, SCS) and the 3GPP network is performed inside the PLMN. In FIG. 7(*b*) and FIG. 7(*c*), an interface between the MTC server (for example, SCS) and the MTC application is not handled by the 3GPP standard.

Meanwhile, since the indirect models of FIG. 7(*b*) and FIG. 7(*c*) are mutually complementary without exclusive, the 3GPP operator may combine these models for different applications. That is, an MTC communication model may be implemented as a hybrid model of a direct model and an indirect model which are simultaneously used as shown in FIG. 7(*d*). In case of the hybrid model, the MTC device can perform communication with a plurality of MTC servers (for example, SCS) within HPLMN, and capabilities provided to MTC applications may be different between the MTC server (for example, SCS) controlled by the service provider and the MTC server (for example, SCS) controlled by the 3GPP operator.

Figure 8:
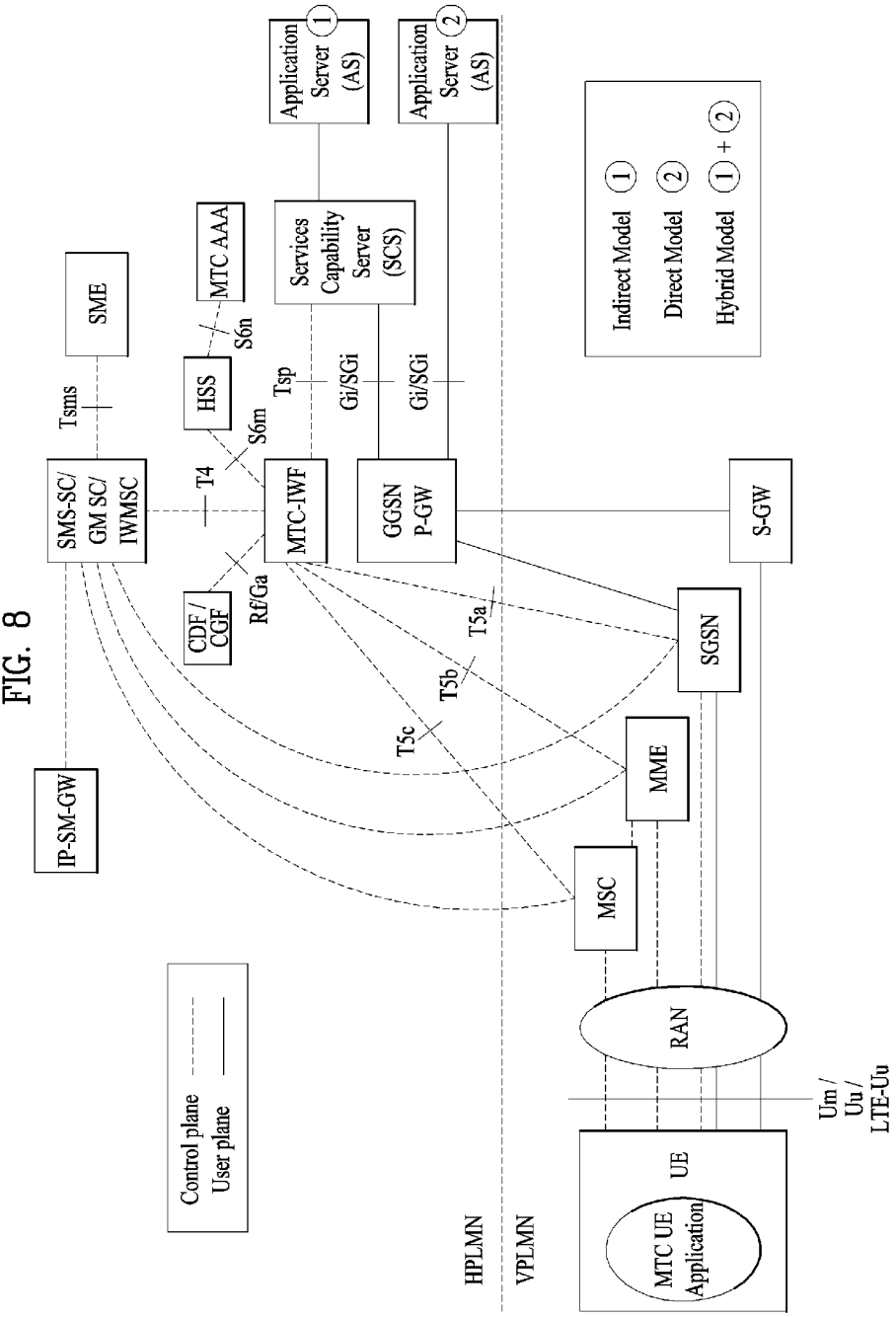
FIG. 8 is a diagram illustrating an exemplary model of a Machine Type Communication (MTC) architecture.

FIG. 8 is a diagram illustrating an exemplary model of a Machine Type Communication (MTC) architecture.

An end-to-end application between a UE (or MTC device) used for an MTC and an MTC application can use services provided by a 3GPP system and selective services provided by an MTC server (for example, SCS). The 3GPP system can provide transportation and communication services (including 3GPP bearer service, IMS and SMS) including various optimizations for enabling the MTC to be smoothly performed. FIG. 8 illustrates that the UE used for the MTC is connected to a 3GPP network (UTRAN, E-UTRAN, GERAN, I-WLAN, and the like) through Um/Uu/LTE-Uu interface. An architecture depicted in FIG. 8 includes various MTC models described with reference to FIG. 7.

First of all, entities shown in FIG. 8 will be described.

In FIG. 8, an application server (AS) corresponds to a server in which an MTC application is executed on a network, and may be referred to as an MTC application server (AS). The aforementioned various technologies to implement the MTC application can be applied to the MTC server. Detailed description on the technologies will be omitted. Also, in FIG. 8, the MTC application server (AS) can access an MTC server (for example, SCS in the example of FIG. 8) through a reference point API, and its detailed description will be omitted. Otherwise, the MTC application server (AS) may be co-located together with the MTC server (for example, SCS).

The MTC server (for example, SCS) is a server managing the MTC device on the network. The MTC server can be connected with the 3GPP network to perform communication with the UE used for the MTC and nodes of PLMN.

An MTC-IWF (MTC-interworking function) controls interworking between the MTC server and an operator core network and may play a role of a proxy of an MTC operation. In order to support an MTC indirect or hybrid model, at least one MTC-IWF may exist in a home PLMN (HPLMN). The MTC-IWF can make a specific function of the PLMN work by relaying or interpreting a signaling protocol on a reference point Tsp. The MTC-IWF can perform a function of authenticating the MTC server before the MTC server establishes communication with the 3GPP network, a function of authenticating a control plane request requested by the MTC server, various functions related to a trigger indication, which is described later, and the like.

An SMS-SC (short message service-service center)/IP-SM-GW (Internet protocol short message gateway) can manage transmission and reception of an SMS (short message service). The SMS-SC may be in charge of relaying a short message between an SME (short message entity) (an entity transmitting or receiving a short message) and a mobile station and performing a function of storing-and-delivering the short message. The IP-SM-GW may be in charge of a protocol interworking between an IP-based UE and the SMS-SC.

A CDF (charging data function)/CGF (charging gateway function) may perform an operation related to charging.

An HLR/HSS may perform a function of storing subscriber information (IMSI and the like), routing information, configuration information and the like and a function of providing the informations to the MTC-IWF.

An MSC/SGSN/MME can perform such a control function as mobility management, authentication, and resource allocation, for network connection of the UE. In relation to a triggering described later, the MSC/SGSN/MME can receive a trigger indication from the MTC-IWF and perform a function of processing the trigger indication into a form of a message provided to the MTC device.

A GGSN (gateway GPRS support node)/S-GW (serving gateway)+P-GW (packet data network-gateway) can perform a function of a gateway taking charge of establishing a connection between a core network and an external network.

The following Table 2 is a summary of the main reference points depicted in FIG. 8.

TABLE 2

| Reference point | Description |
|---|---|
| Tsms | Reference point used by an entity outside the 3GPP system to communicate with MTC device through SMS. |
| Tsp | Reference point used by SCS to communicate with MTC-IWF in relation to control plane signaling. |
| T4 | Reference point used by MTC-IWF to rout a device trigger to SMS-SC of HPLMN. |

TABLE 2-continued

| Reference point | Description |
|---|---|
| T5a | Reference point between MTC-IWF and SGSN. |
| T5b | Reference point between MTC-IWF and serving MME. |
| T5c | Reference point between MTC-IWF and serving MSC. |
| S6m | Reference point used by MTC-IWF to inquiry identification information (E.164 MSISDN (Mobile Station International Subscriber Directory Number) or external identifier mapped into IMSI) of UE and collect UE reachability and configuration information. |
| S6n | Reference point supporting communication included in subscriber information and MTC device (or UE) information between MTC-AAA and HSS/HLR. |

Among the aforementioned T5a, T5b, and T5c, at least one reference point may be referred to as T5.

Meanwhile, user plane communication with the MTC server (for example, SCS) in case of the indirect model and the hybrid model and communication with the MTC application server (AS) in case of the direct model and the hybrid model can be performed using a legacy protocol through reference points Gi and SGi.

Details related to the description made with reference to FIGS. 7 and 8 will be understood with reference to 3GPP TS 23.682 document.

MTC Device Triggering and Cancellation

As compared with the legacy person-to-person communication mode, MTC is characterized in that a large number of devices generally transmit and receive small capacity of data. Also, MTC is performed in accordance with a predetermined period or during occurrence of a specific event, and is performed rarely. Considering this, the MTC device is usually set to an offline state to minimize power consumption. Alternatively, the MTC device may not establish connection (for example, IP (Internet Protocol) connection) for data transmission and reception to use minimum system resources even though the MTC device is set to an online state. These exemplary cases are included in a case where an IP address of the MTC device is neither available nor reachable by a server. In this case, to perform MTC, a request or indication signaling is required to allow the MTC device to establish IP connection. This may be referred to as trigger indication for the MTC device. Also, the operation for establishing IP connection in the MTC device in accordance with a predetermined request or indication signaling from an MTC server may be referred to as MTC device triggering.

Meanwhile, an issue of cancelling previously submitted trigger messages in relation to MTC device triggering has been discussed under the 3GPP release-12 standardization.

The status that the UE (or MTC device) cannot receive a trigger message temporarily may occur actually. For example, the UE may be located outside coverage or may fail to receive and process a trigger message due to another task, or a storage space may not be sufficient. Under the circumstances, the network should enqueue an undelivered trigger message for the same UE and later retry delivery (if validity period does not expire).

However, if the trigger message is not delivered, this operation may be redundant and unnecessary. The SCS or the AS (application server) should recall the trigger message. In any case, the undelivered trigger message may need to be replaced with a new trigger message. For example, although the undelivered trigger message has requested the UE to "transmit a read result of a sensor A", if a subsequent trigger message requests the UE to "transmit read results of all available sensors", the undelivered trigger message may be required to be replaced.

If the network fails to provide a capability of recalling or replacing the undelivered trigger message, a plurality of unnecessary trigger messages may be delivered to the UE, whereby network resources may be wasted. For this reason, a problem occurs in that the triggering system may be very inefficient. To solve this problem, a trigger message previously submitted but not delivered to the UE should be recalled or replaced.

To this end, a method for handling a request of cancelling (for example, recalling or replacing) a device trigger message which has been previously submitted but not delivered to a UE is defined in the 3GPP TR 23.887 v.1.10 document. A method for canceling (recalling/replacing) a device trigger message may be defined for a reference point Tsp, T4 or T5 of FIG. 8 and will be described in detail as follows.

Figure 9:
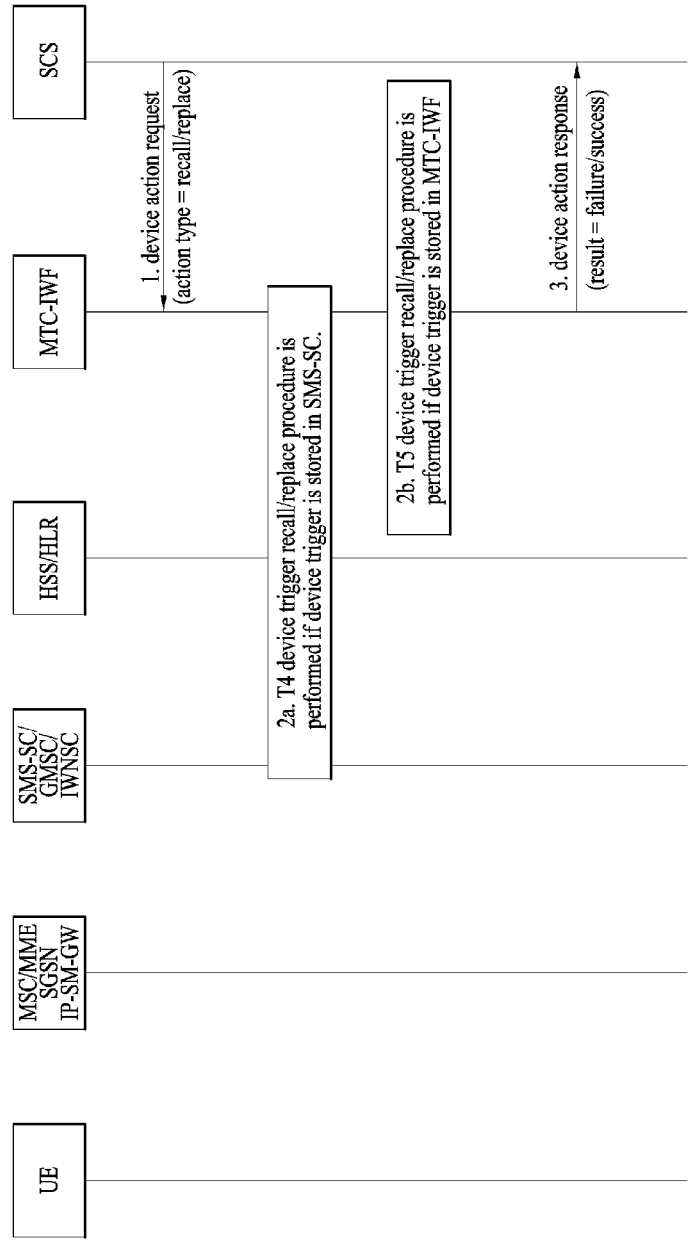
FIG. 9 is a diagram illustrating a method for recalling/replacing a device trigger on a Tsp reference point.

FIG. 9 is a diagram illustrating a method for recalling/replacing a device trigger on a Tsp reference point.

In step 1 of FIG. 9, if the SCS determines that a previously submitted trigger message is required to be recalled/replaced, the SCS can transmit a device action request message to the MTC-IWF. The device action request message may include an external identifier or MSIDSN, an SCS identifier, an old trigger reference number, a new trigger reference number, a validity period, a priority and a trigger payload. Also, an action type of the device action request message may be set to "trigger recall request" or "trigger replace request". In case of the trigger replace request only, the SCS may include a new trigger reference number, a validity period, a priority and a trigger payload in the device action request. The old trigger reference number indicates a trigger reference number allocated to a trigger message which has been previously submitted but intended to be cancelled by the SCS. The new trigger reference number is allocated by the SCS to a trigger message which is newly submitted.

If the SCS exceeds a quota or rate of trigger submission on the Tsp, the MTC-IWF may reject the device action request message transmitted by the SCS by transmitting a device trigger confirm message having a cause value indicating a failure cause to allow the action type to be set to "trigger recall request" or "trigger replace request". In this case, a flow is stopped.

In step 2a of FIG. 9, if a trigger message to be recalled or replaced is stored in the SMS-SC, a procedure of recalling/replacing a T4 device trigger, which is described with reference to FIG. 10 or 11, may be performed.

In step 2b of FIG. 9, if a trigger message to be recalled or replaced is stored in the MTC-IWF, a procedure of recalling/replacing a T5 device trigger, which is described with reference to FIG. 12 or 13, may be performed.

In step 3 of FIG. 9, the MTC-IWF may notify the SCS of trigger recall/replacing success or failure through a device action answer message. If recall/replacing of the trigger is successful, it may be reflected in a "device trigger report" of an original trigger message having a delivery result such as "recalled"/"replaced".

Figure 10:
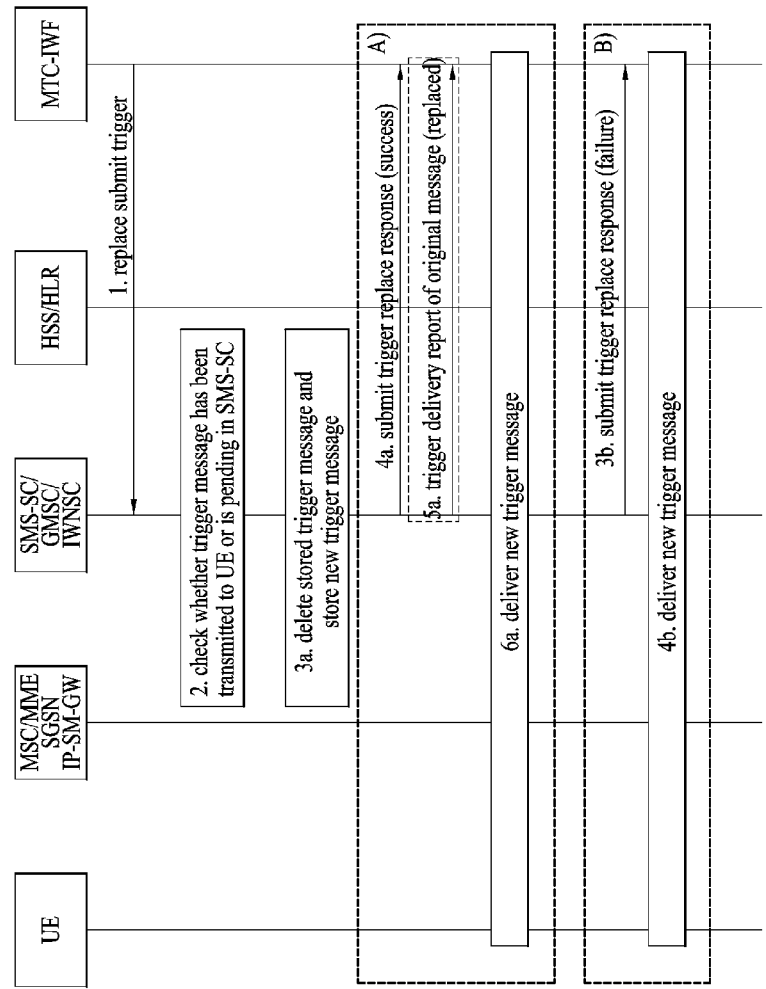
FIG. 10 is a diagram illustrating a method for replacing a device trigger on a T4 reference point.

FIG. 10 is a diagram illustrating a method for replacing a device trigger on a T4 reference point.

In step 1 of FIG. 10, the MTC-IWF can transmit a submit trigger replace message to the SMS-SC on the basis of the action type of the device action request message. The submit trigger replace message may include an external identifier or MSIDSN, IMSI, an SCS identifier, an old trigger reference number, a new trigger reference number, a validity period, a priority and a trigger payload.

In step 2 of FIG. 10, the SMS-SC can identify a trigger message which should be replaced, on the basis of the external identifier or MSISDN, the SCS identifier and the old trigger reference number, which are included in the received submit trigger replace message. The SMS-SC can check whether the identified trigger message has been already transmitted to the UE or is pending therein.

In a procedure A) of FIG. 10, if the trigger message is pending in the SMS-SC, or if the trigger message has been transmitted to the UE but its delivery is failed, steps 3a to 6a are performed.

In step 3a of FIG. 10, the SMS-SC may delete the stored trigger message, and may store a new trigger message to deliver the new trigger message to the UE when the UE is available.

In step 4a of FIG. 10, the SMS-SC may notify the MTC-IWF that the previously submitted trigger message has been successfully replaced with a new one by transmitting a submit trigger replace response message to the MTC-IWF.

In step 5a of FIG. 10, the SMS-SC may transmit a trigger delivery report indicating that an original trigger message has been replaced.

In step 6a of FIG. 10, if the UE is available, a new trigger message may be delivered to the UE.

In a procedure B) of FIG. 10, if the trigger message is transmitted to the UE and successfully delivered to the UE, or if the original trigger message expires, the steps 3b to 4b are performed. In this case, the SMS-SC considers the new trigger message as a trigger message which should be delivered to the UE.

In step 3b of FIG. 10, the SMS-SC may notify the MTC-IWF that the previously submitted trigger message has been successfully delivered and a new trigger message will be delivered, by transmitting a submit trigger replace response message to the MTC-IWF.

In step 4b of FIG. 10, a procedure of delivering the new trigger message to the UE can be performed.

Figure 11:
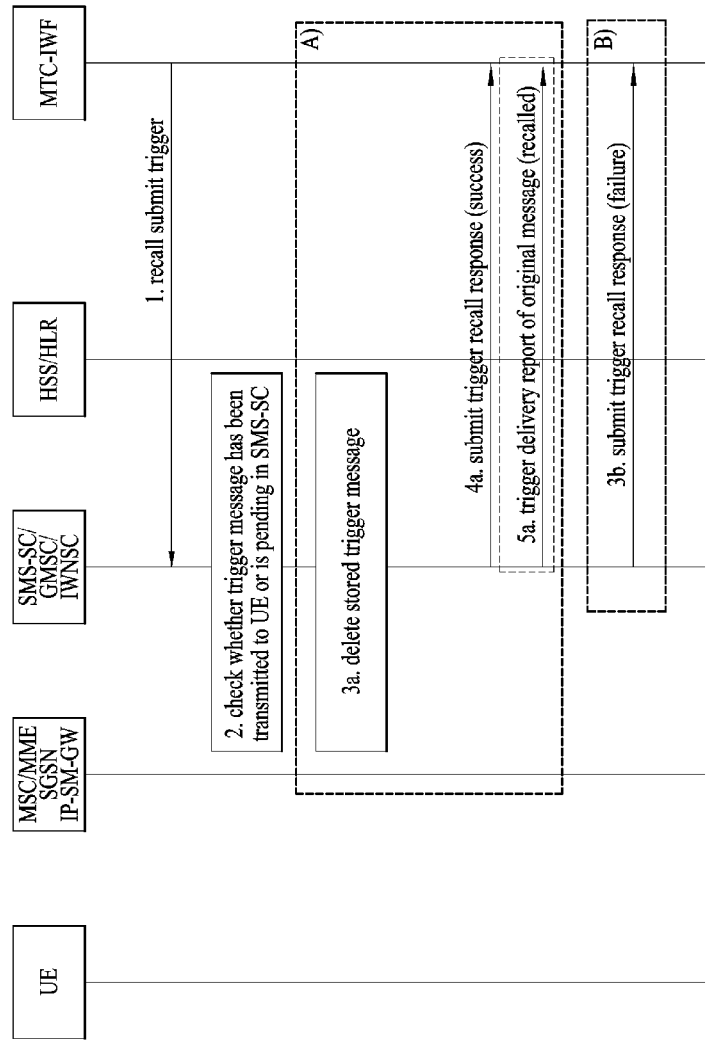
FIG. 11 is a diagram illustrating a method for recalling a device trigger on a T4 reference point.

FIG. 11 is a diagram illustrating a method for recalling a device trigger on a T4 reference point.

In step 1 of FIG. 11, the MTC-IWF can transmit a submit trigger recall message to the SMS-SC on the basis of the action type of the device action request message. The submit trigger recall message may include an external identifier or MSIDSN, IMSI, an SCS identifier, an old trigger reference number, and the like.

In step 2 of FIG. 11, the SMS-SC can identify a trigger message which should be recalled, on the basis of the external identifier or MSISDN, the SCS identifier and the old trigger reference number, which are included in the received submit trigger recall message. The SMS-SC can check whether the identified trigger message has been transmitted to the UE or is pending therein.

In a procedure A) of FIG. 11, if the trigger message is pending in the SMS-SC, or if the trigger message has been transmitted to the UE but its delivery is failed, steps 3a to 6a are performed.

In step 3a of FIG. 11, the SMS-SC may delete the stored trigger message, and may request the HSS to delete an SMS-SC address from a message waiting list.

In step 4a of FIG. 11, the SMS-SC may notify the MTC-IWF that the previously submitted trigger message has been successfully deleted by transmitting a submit trigger recall response message to the MTC-IWF.

In step 5a of FIG. 11, the SMS-SC may transmit a trigger delivery report indicating that an original trigger message has been recalled.

In a procedure B) of FIG. 11, if the trigger message is transmitted to the UE and successfully delivered to the UE, or if the original trigger message expires, the step 3b can be performed.

In step 3b of FIG. 11, the SMS-SC may transmit, to the MTC-IWF, a submit trigger recall response message having a cause value (that is, due to successful delivery of previously submitted trigger message or expiration) indicating that a recall request has been failed.

Figure 12:
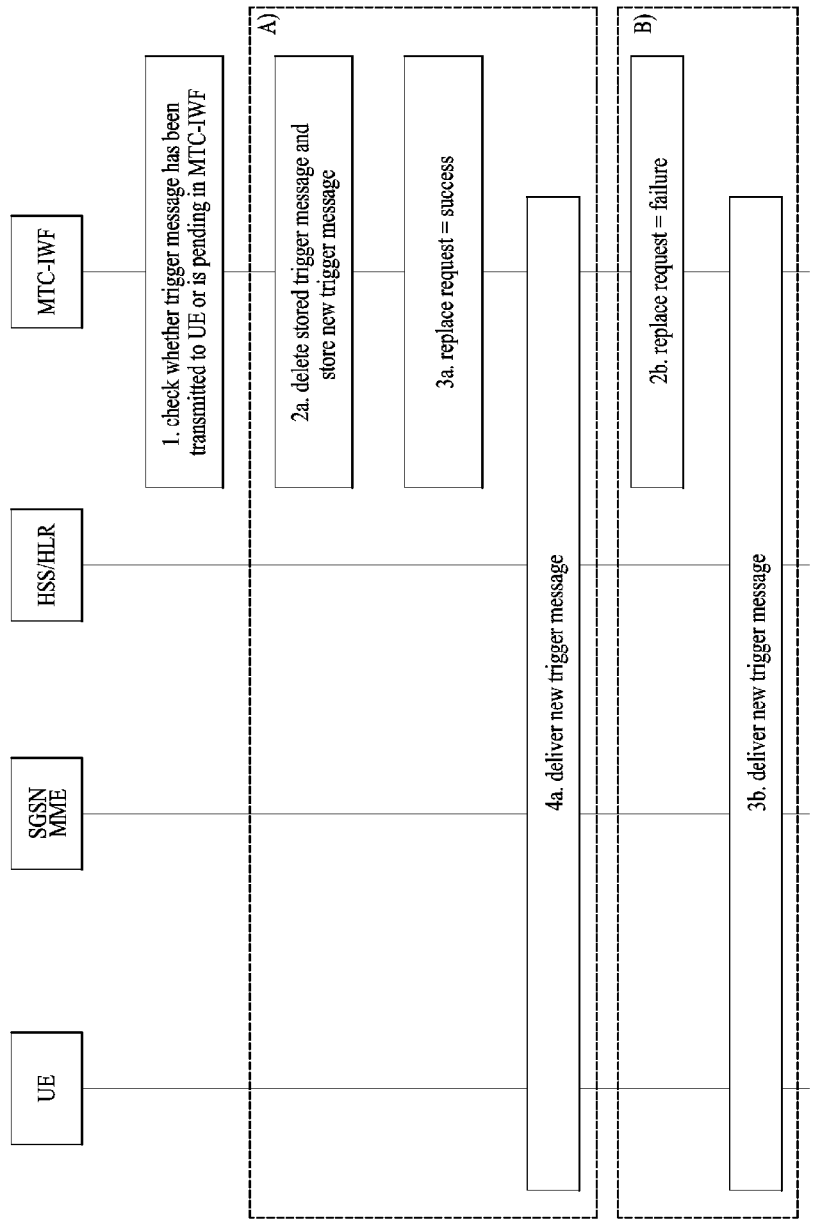
FIG. 12 is a diagram illustrating a method for replacing a device trigger on a T5 reference point.

FIG. 12 is a diagram illustrating a method for replacing a device trigger on a T5 reference point.

In step 1 of FIG. 12, the MTC-IWF can identify a trigger message which should be replaced, on the basis of an external identifier or MSISDN, an SCS identifier and an old trigger reference number, which are included in a received submit trigger replace message. The MTC-IWF can check whether the identified trigger message has been transmitted to the UE or is pending therein.

In a procedure A) of FIG. 12, if the trigger message is pending in the MTW-IWF, or if the trigger message has been transmitted to the UE but its delivery is failed, steps 2a to 4a are performed.

In step 2a of FIG. 12, the MTC-IWF deletes the stored trigger message, and stores a new trigger message to be delivered to the UE when the UE is available.

In step 3a of FIG. 12, the MTC-IWF may consider that the previously submitted trigger message has been successfully replaced.

In step 4a of FIG. 12, if the UE is available, a new trigger message may be delivered to the UE.

In a procedure B) of FIG. 12, if the trigger message is transmitted to the UE and successfully delivered to the UE, or if the original trigger message expires, the steps 2b to 3b are performed. In this case, the MTC-IWF considers the new trigger message as a trigger message which should be delivered to the UE.

In step 2b of FIG. 12, the MTC-IWF may consider that the replace request has been failed (that is, due to successful delivery of the previously submitted trigger message or expiration).

In step 3b of FIG. 12, if the UE is available, a new trigger message may be delivered to the UE.

Figure 13:
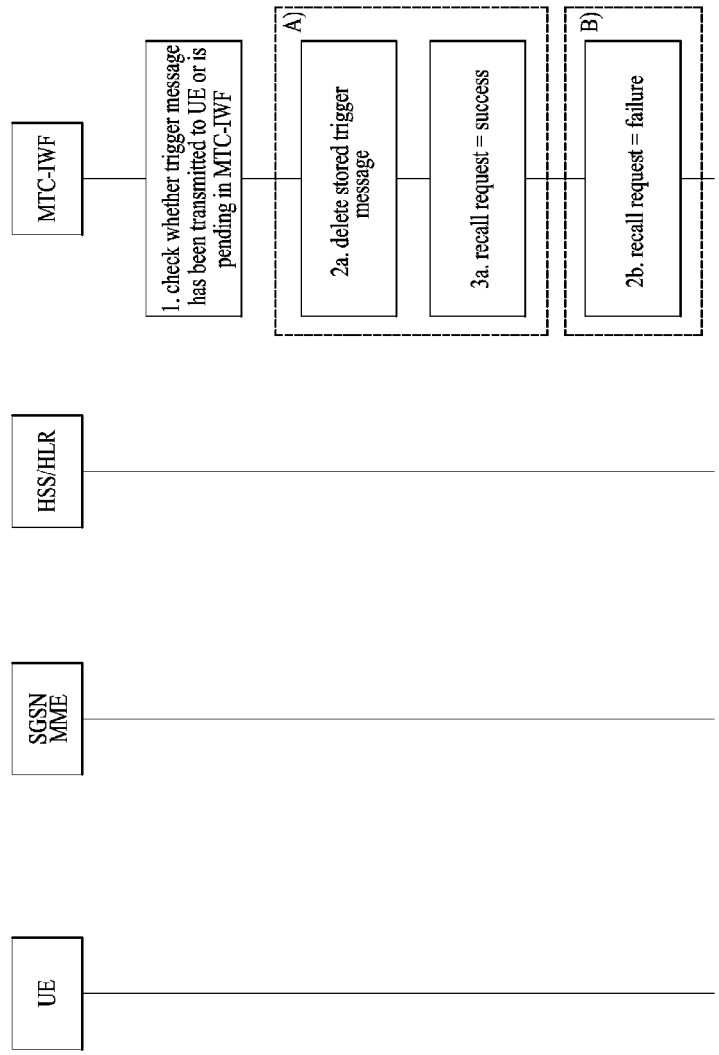
FIG. 13 is a diagram illustrating a method for recalling a device trigger on a T5 reference point.

FIG. 13 is a diagram illustrating a method for recalling a device trigger on a T5 reference point.

In step 1 of FIG. 13, the MTC-IWF can identify a trigger message which should be recalled, on the basis of an external identifier or MSISDN, an SCS identifier and an old trigger reference number, which are included in a received submit trigger recall message. The MTC-IWF can check whether the identified trigger message has been transmitted to the UE or is pending therein.

In a procedure A) of FIG. 13, if the trigger message is pending in the MTW-IWF, or if the trigger message has been transmitted to the UE but its delivery is failed, steps 2a to 3a are performed.

In step 2a of FIG. 13, the MTC-IWF may delete the stored trigger message. If the MTC-IWF has registered UE reachability notification, the MTC-IWF may deregister from UE reachability notification in the HSS.

In step 3a of FIG. 13, the MTC-IWF may consider that previously submitted trigger message has been successfully deleted.

In a procedure B) of FIG. 13, if the trigger message is transmitted to the UE and successfully delivered to the UE, or if the original trigger message expires, the step 2b may be performed.

In step 2b of FIG. 13, the MTC-IWF may consider that the recall request has been failed (that is, due to successful delivery of the previously submitted trigger message or expiration).

Enhanced Method for Cancelling MTC Device Triggering

The aforementioned replace request of the device trigger message transmitted from the SCS/AS may be understood that the request of cancelling or deleting the previously submitted device trigger message and the request of submitting a new device trigger message are combined with each other. Therefore, the procedure of recalling or replacing the device trigger message may be focused on cancellation or deletion of the previously submitted device trigger message.

Meanwhile, when the SCS/AS considers that the previously submitted device trigger message is not delivered to the UE and transmits the recall or replace request of the previously submitted device trigger message, the device trigger message (that is, previously submitted (or original) device trigger message) may be delivered to the UE. According to the legacy system, even though there is the cancellation request from the SCS/AS, if the original device trigger message has been already delivered to the UE, it is handled that the cancellation is simply failed without a separate solution. However, since the operation (for example, task or reserved task of MTC related information collection, connection to MTC server, data transmission to MTC server, etc.) of the UE according to the original device trigger message of which cancellation has been requested is not effective any more in view of the MTC user, it is required to cancel an unnecessary (or incorrect) task in the UE.

For example, in the T4 based device triggering system (that is, device triggering system based on SMS), since the triggering message already transmitted to the UE is different from a conventional SMS, it is required to cancel the operation of the UE, which is caused due to the triggering message. In more detail, since the conventional SMS (that is, SMS not intended for device triggering) is intended to be displayed for the user, a content of the SMS has been displayed to the user if the SMS has been already transmitted to the UE, whereby the operation of canceling the SMS may not be significant or unnecessary. Also, if the conventional SMS is cancelled, additional display operation may be caused to notify the user of the cancellation, whereby user experience may be more deteriorated. Meanwhile, the SMS intended for device triggering is used as a command for indicating MTC related operation to the UE, and additional operation (for example, MTC related task, reserved task, connection, data transmission, etc.) of the UE is caused due to device triggering. If device triggering is cancelled, the UE operation caused by device triggering is not effective to the UE, whereby it is required to allow the UE operation not to be performed. To this end, it is required to notify the UE of device triggering cancellation, whereby unnecessary operation or error operation of the UE can be prevented from occurring.

The present invention suggests a method for handling a device trigger message of which cancellation is requested (for example, recall is requested or replace is requested). Methods of the present invention, which will be described hereinafter, can be performed by combination of one or more.

Method 1

This method 1 relates to a case where the SMS-SC stores a device trigger message of which cancellation has been requested.

One or more of the following methods 1-1 and 1-2 may be applied to a case where the SMS-SC which stores the device trigger message has already transmitted the device trigger message to the UE when receiving a recall or replace request of the device trigger message from the MTC-IWF.

Method 1-1

The SMS-SC can transmit, to the UE, a notification message (for example, trigger cancel notification message) indicating that cancellation of the device trigger message has been requested. The notification message transmitted to the UE by the SMS-SC, indicating that cancellation of the device trigger message has been requested may be an SMS type message transmitted onto T4. Also, the notification message indicating that cancellation of the device trigger message has been requested may be, but not limited to be defined as, a new type device trigger message.

If the cancellation request is based on the replace request, the SMS-SC may include information indicating that cancellation of a previously transmitted device trigger message has been requested in a new device trigger message (that is, new device trigger message replacing an original device trigger message of which cancellation is requested) while transmitting the new device trigger message to the UE.

A condition for the operation for transmitting the notification message indicating that cancellation of the device trigger message has been requested from the SMS-SC to the UE may be any one of the followings i), ii) and iii):

i) a case where the device trigger message of which cancellation has been requested is delivered to the UE successfully;

ii) a case where the device trigger message of which cancellation has been requested is transmitted regardless of successful delivery to the UE (that is, all cases); and iii) a case where the device trigger message of which cancellation has been requested is delivered to the UE successfully and a case where successful delivery of the device trigger message is not notified (that is, except a case where delivery of the device trigger message, of which cancellation has been requested, to the UE is failed).

Method 1-2

The SMS-SC can transmit, to the MTC-IWF, a notification message indicating that the device trigger message of which cancellation has been requested has been already transmitted to the UE. A condition for the operation for transmitting the notification message from the SMS-SC to the MTC-IWF may be any one of the followings i), ii) and iii):

i) a case where the device trigger message of which cancellation has been requested is delivered to the UE successfully;

ii) a case where the device trigger message of which cancellation has been requested is transmitted regardless of successful delivery to the UE (that is, all cases); and iii) a case where the device trigger message of which cancellation has been requested is delivered to the UE successfully and a case where successful delivery of the device trigger message to the UE is not notified (that is, except a case where delivery of the device trigger message, of which cancellation has been requested, to the UE is failed).

Also, the notification message transmitted from the SMS-SC to the MTC-IWS may additionally include status information at the SMS-SC, which indicates whether the device trigger message of which cancellation has been requested has been already transmitted to the UE, indicates whether delivery of the device trigger message is successful or failed if the corresponding device trigger message has been transmitted to the UE, or indicates whether successful delivery or failure delivery of the corresponding device trigger message is not notified.

The MTC-IWF that has received the notification message from the SMS-SC can transmit, to the UE, a notification message (for example, trigger cancel notification message) indicating that cancellation of the device trigger message has been requested.

A condition for the operation for transmitting the notification message from the MTC-IWF (which has received the notification message from the SMS-SC) to the UE may be any one of the followings i), ii) and iii):

i) a case where the device trigger message of which cancellation has been requested is delivered to the UE successfully;

ii) a case where the device trigger message of which cancellation has been requested is transmitted regardless of successful delivery to the UE (that is, all cases); and iii) a case where the device trigger message of which cancellation has been requested is delivered to the UE successfully and a case where successful delivery of the device trigger message to the UE is not notified (that is, except a case where delivery of the device trigger message, of which cancellation has been requested, to the UE is failed).

The notification message transmitted to the UE by the MTC-IWF, indicating that cancellation of the device trigger message has been requested may be a message transmitted onto T4 or T5. Also, the notification message indicating that cancellation of the device trigger message has been requested may be, but not limited to be defined as, a new type device trigger message.

The method 1-1 may be used for or applied to a mobile communication network that supports a T4 based device triggering system, and the method 1-2 may be used for or applied to a mobile communication network that supports both a T4 based device triggering system and a T5 based device triggering system. However, considering a system supported by the mobile communication network and efficiency, a proper method may be applied to the mobile communication network without being limited to the above methods.

Method 2

This method 2 relates to a case where the MTC-IWF stores a device trigger message of which cancellation has been requested.

The following method may be applied to a case where the MTC-IWF which stores the device trigger message has already transmitted the device trigger message to the UE when receiving a recall or replace request of the device trigger message from the SCS-AS.

The MTC-IWF can transmit, to the UE, a notification message (for example, trigger cancel notification message) indicating that cancellation of the device trigger message has been requested. The notification message transmitted to the UE by the MTC-IWF, indicating that cancellation of the device trigger message has been requested may be a message transmitted onto T4 or T5. Also, the notification message indicating that cancellation of the device trigger message has been requested may be, but not limited to be defined as, a new type device trigger message.

If the cancellation request is based on the replace request, the MTC-IWF may include information indicating that cancellation of a previously transmitted device trigger message has been requested in a new device trigger message (that is, new device trigger message replacing an original device trigger message of which cancellation is requested) while transmitting the new device trigger message to the UE.

A condition for the operation for transmitting the notification message indicating that cancellation of the device trigger message has been requested from the MTC-IWF to the UE may be any one of the followings i), ii) and iii):

i) a case where the device trigger message of which cancellation has been requested is delivered to the UE successfully;

ii) a case where the device trigger message of which cancellation has been requested is transmitted regardless of successful delivery to the UE (that is, all cases); and iii) a case where the device trigger message of which cancellation has been requested is delivered to the UE successfully and a case where successful delivery of the device trigger message is not notified (that is, except a case where delivery of the device trigger message, of which cancellation has been requested, to the UE is failed).

The method 2 may be used for or applied to a mobile communication network that supports a T5 based device triggering system, and may be used for or applied to a mobile communication network that supports both a T4 based device triggering system and a T5 based device triggering system. However, considering a system supported by the mobile communication network and efficiency, a proper method may be applied to the mobile communication network without being limited to the above method.

In the aforementioned methods according to the present invention, the notification message transmitted from the SMS-SC or the MTC-IWF to the UE, indicating that cancellation of the device trigger message has been requested may include information (for example, old device trigger reference number) for identifying the device trigger message of which cancellation has been requested. Also, the notification message may include various kinds of information as a basis that can determine an operation performed by the UE, which receives the notification message, for the device trigger message of which cancellation has been requested. This information may be included in a header part and/or data (payload) part of the notification message indicating that cancellation of the device trigger message has been requested. If the notification message indicating that cancellation of the device trigger message has been requested is defined as a new type device trigger message, the information may be included in a header part and/or data (payload) part of the new type device trigger message.

Also, although the aforementioned methods of the present invention have been described based on the device trigger message, the principle suggested in the present invention may equally be applied to even a case where a small data message which has previously been submitted but not delivered to the UE has been already transmitted to the UE when a cancellation (for example, recall or replace) request of the small data message occurs.

Embodiment 1

Figure 14:
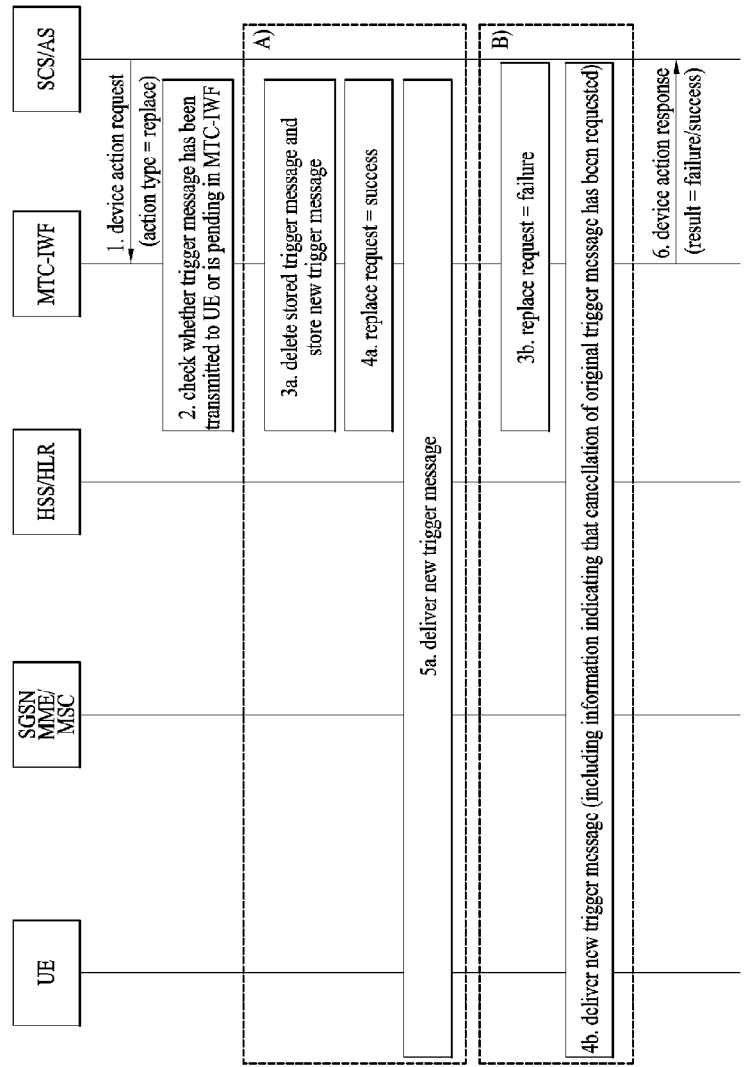
FIG. 14 is a diagram illustrating a procedure of replacing a device trigger according to one embodiment of the present invention.

FIG. 14 is a diagram illustrating a procedure of replacing a device trigger according to one embodiment of the present invention.

In step 1 of FIG. 14, if the SCS/AS determines that a previously submitted trigger message (for example, the first trigger message) is required to be replaced, the SCS/AS can transmit a device action request message to the MTC-IWF. The device action request message may include an external identifier or MSIDSN, an SCS identifier, an old trigger reference number, a new trigger reference number, a validity period, a priority and a trigger payload. Also, an action type of the device action request message may be set to "trigger replace request".

The old trigger reference number indicates a trigger reference number allocated to a trigger message (for example, the first trigger message) which has been previously submitted but intended to be cancelled by the SCS/AS. The new trigger reference number is allocated by the SCS/AS to a trigger message (for example, the second trigger message) which is newly submitted.

If the SCS/AS exceeds a quota or rate of trigger submission on the Tsp, the MTC-IWF may reject the device action request message transmitted by the SCS/AS by transmitting a device trigger confirm message having a cause value indicating a failure cause to allow the action type to be set to "trigger replace request". In this case, a flow is stopped.

In step 2 of FIG. 14, the MTC-IWF can identify a trigger message which should be replaced, on the basis of the external identifier or MSISDN, the SCS identifier and the old trigger reference number, which are included in the received submit trigger replace message. The MTC-IWF can check whether the identified trigger message has been already transmitted to the UE or is pending therein.

In a procedure A) of FIG. 14, if the trigger message is pending in the MTC-IWF, or if the trigger message has been transmitted to the UE but its delivery is failed, steps 3a to 5a are performed.

In step 3a of FIG. 14, the MTC-IWF may delete the stored trigger message (for example, the first trigger message), and may store a new trigger message (for example, the second trigger message) to deliver the new trigger message to the UE when the UE is available.

In step 4a of FIG. 14, the MTC-IWF may consider that the previously submitted trigger message (for example, the first trigger message) has been successfully replaced.

In step 5a of FIG. 14, the MTC-IWF may deliver a new trigger message (for example, the second message) to the UE if the UE is available. Delivery of the new trigger message may depend on a procedure of downlink small data transmission.

For example, the procedure of downlink small data transmission may include the steps of 1) transmitting a query from the MTC-IWF to the HSS and receiving a response to the query, 2) transmitting a T5-AP-PDU (SDT-PDU) from the MTC-IWF to the SGSN/MME, 3) transmitting a NAS-PDU (SDT-PDU) from the SGSN/MME to the UE, 4) transmitting an SDT-PDU from the UE to an application, 5) transmitting a confirmation of delivery from the application to the UE, 6) transmitting a NAS-PDU-Ack message from the UE to the SGSN/MME, and 7) transmitting a T5-AP-PDU-Ack message from the SGSN/MME to the MTC-IWF.

In a procedure B) of FIG. 14, if the trigger message is transmitted to the UE and successfully delivered to the UE, or if the original trigger message expires, the steps 3b to 4b are performed. In this case, the MTC-IWF considers the new trigger message as a trigger message which should be delivered to the UE.

In step 3b of FIG. 14, the MTC-IWF may consider that the replace request has been failed (that is, due to successful delivery of the previously submitted trigger message, or expiration).

In step 4b of FIG. 14, a new trigger message (for example, the second message) may be delivered to the UE if the UE is available. Delivery of the new trigger message may depend on a procedure of downlink small data transmission.

If the original trigger message (for example, the first trigger message) is already transmitted to the UE, the MTC-IWF may transmit the new trigger message (for example, the second trigger message) to the UE by including information, which indicates that cancellation of the original trigger message (for example, the first trigger message) has been requested, in the new trigger message. The UE that has received the new trigger message, which includes the information indicating that cancellation of the original trigger message has been requested, may perform a corresponding operation. For example, the UE may perform an operation which should be performed in accordance with the original trigger message, such as cancelling a task or reserved task, cancelling connection to the MTC server, or cancelling data transmission to the MTC server.

In step 6 of FIG. 14, the MTC-IWF can notify the SCS/AS of trigger replace success or failure through a device action answer message.

Embodiment 2

Figure 15:
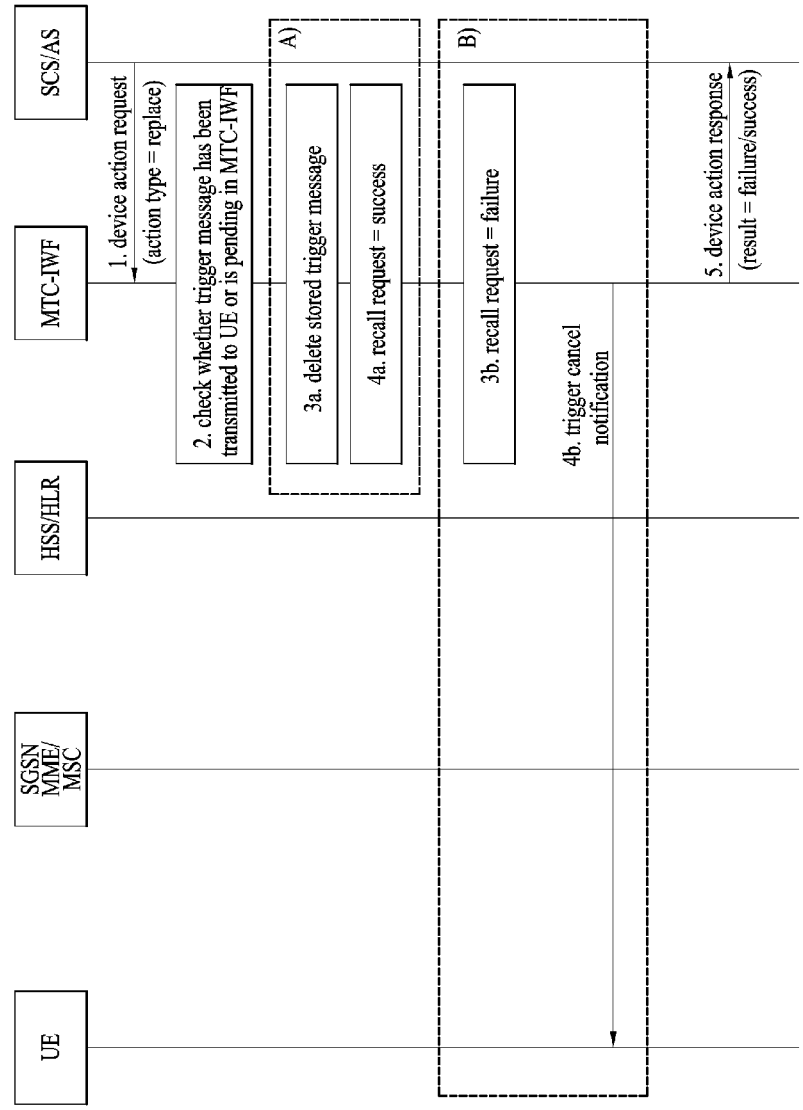
FIG. 15 is a diagram illustrating a procedure of recalling a device trigger according to one embodiment of the present invention.

FIG. 15 is a diagram illustrating a procedure of recalling a device trigger according to one embodiment of the present invention.

In step 1 of FIG. 15, if the SCS/AS determines that a previously submitted trigger message (for example, the first trigger message) is required to be recalled, the SCS/AS can transmit a device action request message to the MTC-IWF. The device action request message may include an external identifier or MSIDSN, an SCS identifier, an old trigger reference number, etc. Also, an action type of the device action request message may be set to "trigger recall request".

The old trigger reference number indicates a trigger reference number allocated to a trigger message which has been previously submitted but intended to be cancelled by the SCS.

If the SCS/AS exceeds a quota or rate of trigger submission on the Tsp, the MTC-IWF may reject the device action request message transmitted by the SCS/AS by transmitting a device trigger confirm message having a cause value indicating a failure cause to allow the action type to be set to "trigger recall request". In this case, a flow is stopped.

In step 2 of FIG. 15, the MTC-IWF can identify a trigger message which should be recalled, on the basis of the external identifier or MSIDSN, the SCS identifier and the old trigger reference number, which are included in the received submit trigger replace message. The MTC-IWF can check whether the identified trigger message has been already transmitted to the UE or is pending therein.

In a procedure A) of FIG. 15, if the trigger message is pending in the MTC-IWF, or if the trigger message has been transmitted to the UE but its delivery is failed, steps 3a to 4a are performed.

In step 3a of FIG. 15, the MTC-IWF may delete the stored trigger message. If the MTC-IWF has registered UE reachability notification, the MTC-IWF may deregister from UE reachability notification in the HSS.

In step 4a of FIG. 15, the MTC-IWF may consider that the previously submitted trigger message has been successfully deleted.

In a procedure B) of FIG. 15, if the trigger message is transmitted to the UE and successfully delivered to the UE, or if the original trigger message expires, the steps 3b to 4b may be performed.

In step 3b of FIG. 15, the MTC-IWF may consider that the recall request has been failed (that is, due to successful delivery of the previously submitted trigger message or expiration).

In step 4b of FIG. 15, if the original trigger message (for example, the first trigger message) is already transmitted to the UE, the MTC-IWF may transmit, to the UE, a predetermined message (for example, trigger cancel notification message), which includes information indicating that cancellation of the original trigger message has been requested. The UE that has received the predetermined message, which includes the information indicating that cancellation of the original trigger message has been requested, may perform a corresponding operation. For example, the UE may perform an operation which should be performed in accordance with the original trigger message, such as cancelling a task or reserved task, cancelling connection to the MTC server, or cancelling data transmission to the MTC server.

In step 5 of FIG. 15, the MTC-IWF can notify the SCS/AS of trigger recall success or failure through a device action answer message.

Embodiment 3

Figure 16:
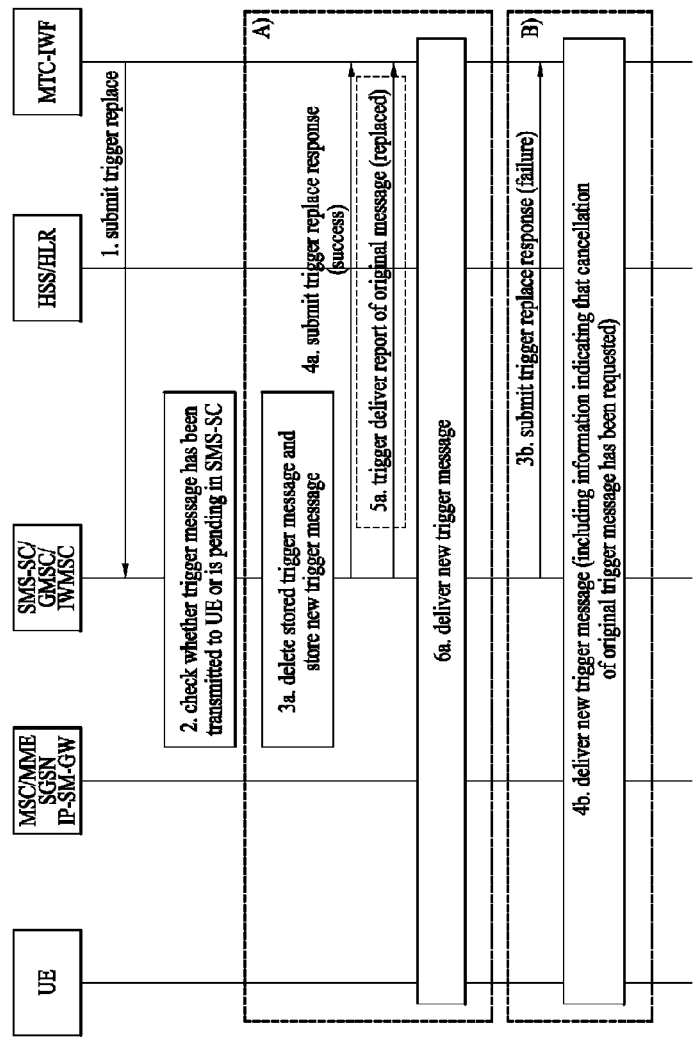
FIG. 16 is a diagram illustrating a procedure of replacing a device trigger according to another embodiment of the present invention.

FIG. 16 is a diagram illustrating a procedure of replacing a device trigger according to another embodiment of the present invention.

In step 1 of FIG. 16, the MTC-IWF can transmit a submit trigger replace message to the SMS-SC on the basis of the action type of the device action request message. The submit trigger replace message may include an external identifier or MSIDSN, IMSI, an SCS identifier, an old trigger reference number, a new trigger reference number, a validity period, a priority and a trigger payload.

In step 2 of FIG. 16, the SMS-SC can identify a trigger message which should be replaced, on the basis of the external identifier or MSIDSN, the SCS identifier and the old trigger reference number, which are included in the received submit trigger replace message. The SMS-SC can check whether the identified trigger message (for example, the first trigger message) has been already transmitted to the UE or is pending therein.

In a procedure A) of FIG. 16, if the trigger message (for example, the first trigger message) is pending in the SMS-SC, or if the trigger message (for example, the first trigger message) has been transmitted to the UE but its delivery is failed, steps 3a to 6a are performed.

In step 3a of FIG. 16, the SMS-SC may delete the stored trigger message (for example, the first trigger message), and may store a new trigger message (for example, the second trigger message) to deliver the new trigger message to the UE when the UE is available.

In step 4a of FIG. 16, the SMS-SC may notify the MTC-IWF that the previously submitted trigger message (for example, the first trigger message) has been successfully replaced with a new one by transmitting a submit trigger replace response message to the MTC-IWF.

In step 5a of FIG. 16, the SMS-SC may transmit a trigger delivery report indicating that an original trigger message (for example, the first trigger message) has been replaced.

In step 6a of FIG. 16, if the UE is available, a new trigger message (for example, the second trigger message) may be delivered to the UE.

In a procedure B) of FIG. 16, if the trigger message (for example, the first trigger message) is transmitted to the UE and successfully delivered to the UE, or if the original trigger message (for example, the first trigger message)

expires, the steps 3b to 4b are performed. In this case, the SMS-SC considers the new trigger message (for example, the second trigger message) as a trigger message which should be delivered to the UE.

In step 3b of FIG. 16, the SMS-SC may notify the MTC-IWF that the previously submitted trigger message (for example, the first trigger message) has been successfully delivered and a new trigger message (for example, the second trigger message) will be delivered, by transmitting a submit trigger replace response message to the MTC-IWF.

In step 4b of FIG. 16, a procedure of delivering the new trigger message (for example, the second trigger message) to the UE can be performed.

If the original trigger message (for example, the first trigger message) is already transmitted to the UE, the MTC-IWF may transmit the new trigger message (for example, the second trigger message) to the UE by including information, which indicates that cancellation of the original trigger message (for example, the first trigger message) has been requested, in the new trigger message. The UE that has received the new trigger message, which includes the information indicating that cancellation of the original trigger message has been requested, may perform a corresponding operation. For example, the UE may perform an operation which should be performed in accordance with the original trigger message, such as cancelling a task or reserved task, cancelling connection to the MTC server, or cancelling data transmission to the MTC server.

Embodiment 4

Figure 17:
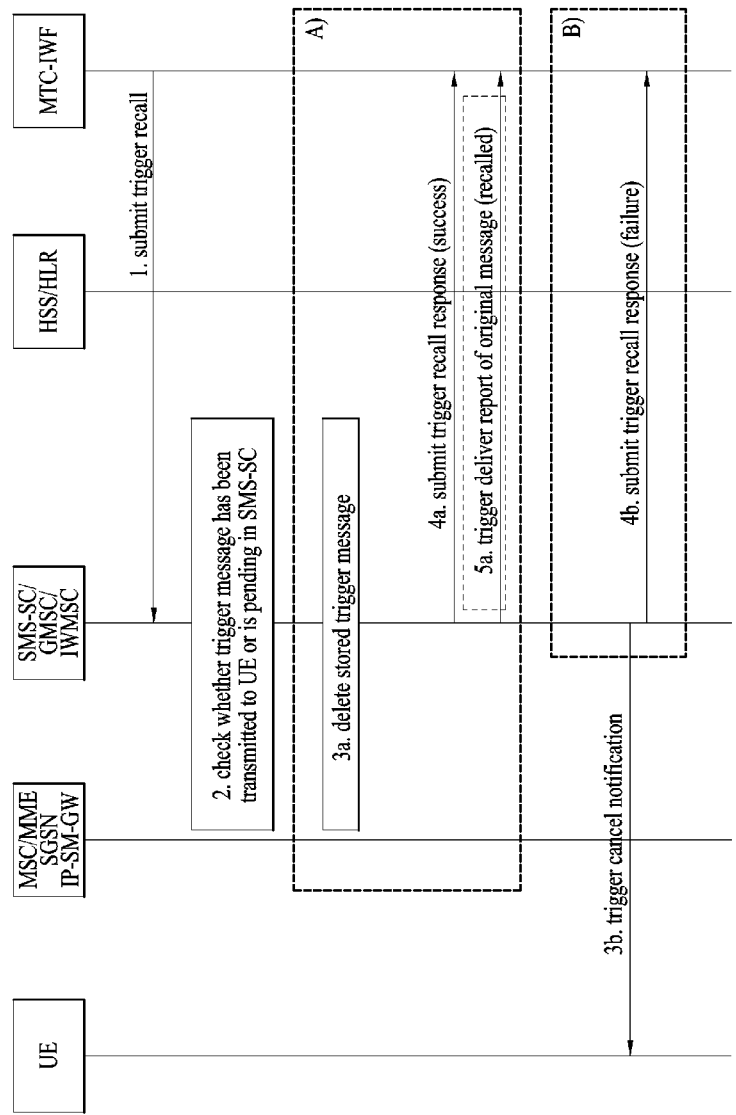
FIG. 17 is a diagram illustrating a procedure of recalling a device trigger according to another embodiment of the present invention.

FIG. 17 is a diagram illustrating a procedure of recalling a device trigger according to another embodiment of the present invention.

In step 1 of FIG. 17, the MTC-IWF can transmit a submit trigger recall message to the SMS-SC on the basis of the action type of the device action request message. The submit trigger recall message may include an external identifier or MSIDSN, IMSI, an SCS identifier, an old trigger reference number, etc.

In step 2 of FIG. 17, the SMS-SC can identify a trigger message which should be recalled, on the basis of the external identifier or MSISDN, the SCS identifier and the old trigger reference number, which are included in the received submit trigger recall message. The SMS-SC can check whether the identified trigger message (for example, the first trigger message) has been transmitted to the UE or is pending therein.

In a procedure A) of FIG. 17, if the trigger message (for example, the first trigger message) is pending in the SMS-SC, or if the trigger message (for example, the first trigger message) has been transmitted to the UE but its delivery is failed, steps 3a to 5a are performed.

In step 3a of FIG. 17, the SMS-SC can delete the stored trigger message (for example, the first trigger message), and can request the HSS to delete an SMS-SC address from a message waiting list.

In step 4a of FIG. 17, the SMS-SC may notify the MTC-IWF that the previously submitted trigger message (for example, the first trigger message) has been successfully deleted by transmitting a submit trigger recall response message to the MTC-IWF.

In step 5a of FIG. 17, the SMS-SC may transmit a trigger delivery report indicating that an original trigger message (for example, the first trigger message) has been recalled.

In a procedure B) of FIG. 17, if the trigger message (for example, the first trigger message) is transmitted to the UE and successfully delivered to the UE, or if the original trigger message (for example, the first trigger message) expires, the step 3b can be performed.

In step 3b of FIG. 17, if the original trigger message (for example, the first trigger message) is already transmitted to the UE, the MTC-IWF may transmit, to the UE, a predetermined message (for example, trigger cancel notification message), which includes information indicating that cancellation of the original trigger message has been requested. The UE that has received the predetermined message, which includes the information indicating that cancellation of the original trigger message has been requested, may perform a corresponding operation. For example, the UE may perform an operation which should be performed in accordance with the original trigger message, such as cancelling a task or reserved task, cancelling connection to the MTC server, or cancelling data transmission to the MTC server.

In step 4b of FIG. 17, the SMS-SC can transmit, to the MTC-IWF, a submit trigger recall response message having a cause value (that is, due to successful delivery of previously submitted trigger message (for example, the first trigger message) or expiration) indicating that a recall request has been failed.

Although the exemplary methods described in FIGS. 14 to 17 have been expressed as a series of operations for conciseness of description, a series of the operations are not intended to limit the order of steps, and the respective steps may be performed simultaneously or at different orders if necessary. Also, it is to be understood that all the steps illustrated in FIGS. 14 to 17 are not required necessarily to implement the methods suggested in the present invention.

The methods illustrated in FIGS. 14 to 17 may be implemented in such a manner that the matters described in the aforementioned various embodiments of the present invention may be applied to the methods independently or two or embodiments may be applied to the methods simultaneously.

Figure 18:
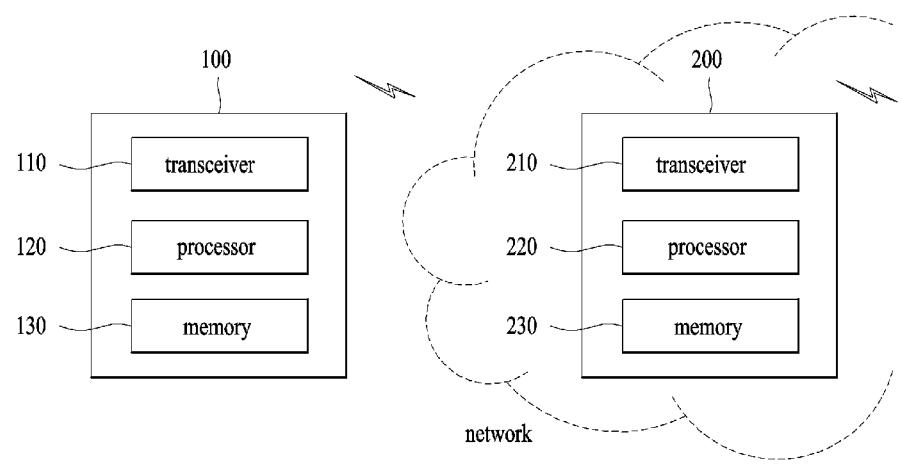
FIG. 18 is a diagram illustrating a user equipment and a network node device according to a preferred embodiment of the present invention.

FIG. 18 is a diagram illustrating a user equipment and a network node device according to a preferred embodiment of the present invention.

Referring to FIG. 18, the user equipment 100 according to the present invention may include a transceiving module 110, a processor 120, and a memory 130. The transceiving module 110 may be configured to transmit various signals, data and information to an external device and to receive various signals, data and information from the external device. The user equipment 100 may be connected with the external device through the wire and/or wireless. The processor 120 may control the overall operation of the user equipment 100, and may be configured to perform a function of operation-processing information to be transmitted to and received from the external device. Also, the processor 120 may be configured to perform a UE operation suggested in the present invention. The memory 130 may store the operation-processed information for a predetermined time, and may be replaced with a buffer (not shown).

Referring to FIG. 18, the network node device 200 according to the present invention may include a transceiving module 210, a processor 220, and a memory 230. The transceiving module 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to perform a function of operation-processing information to be transmitted to and received from the external device. The memory 230 may store the operation-processed information for a predetermined time, and may be replaced with a buffer (not shown).

Also, the details of the aforementioned user equipment 100 and the aforementioned network node device 200 may be configured in such a manner that the aforementioned various embodiments of the present invention may independently be applied to the aforementioned user equipment 100 and the aforementioned network node device 200, or two or more embodiments may simultaneously be applied to the aforementioned user equipment 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various mobile communication systems.

What is claimed is:
1. A method for cancelling a device trigger in a wireless communication system, the method comprising the steps of:
receiving, from a services capability service/application server (SCS/AS), a cancellation request of a first trigger message in a network node;
checking whether the first trigger message has been transmitted to a user equipment or is pending in the network node; and
transmitting a second trigger message to the user equipment if the cancellation request indicates a replace request,
wherein if the first trigger message has been transmitted to the user equipment, the second trigger message includes cancellation information,
wherein if the transmission of the first trigger message from the network node to the user equipment is canceled by the network node based on the cancellation request of the first trigger message from the SCS/AS or if the first trigger message is pending in the network node, the second trigger message does not include cancellation information, and
wherein the cancellation information indicates that operation of the first trigger message has been canceled by the cancellation request of the SCS/AS.

2. The method according to claim 1, wherein an operation to be performed by the user equipment in accordance with cancellation of the first trigger message includes one or more of cancellation of a task or reserved task based on the first trigger message, cancellation of connection to a network based on the first trigger message, and cancellation of data transmission to a network based on the first trigger message.

3. The method according to claim 1, wherein the second trigger message is transmitted to the user equipment in the case that the first trigger message is successfully delivered to the user equipment, the first trigger message is transmitted to the user equipment regardless of successful delivery of the first trigger message to the user equipment, or the first trigger message is successfully delivered to the user equipment or the network node does not know whether the first trigger message has been transmitted to the user equipment but successfully delivered to the user equipment.

4. The method according to claim 1, wherein, if the first trigger message has been transmitted to the user equipment and the cancellation request indicates a recall request, only the cancellation information is transmitted to the user equipment, and includes information indicating that cancellation of the first trigger message has been requested.

5. The method according to claim 4, wherein the cancellation information further includes information indicating an operation to be performed by the user equipment in accordance with cancellation of the first trigger message.

6. The method according to claim 5, wherein the operation to be performed by the user equipment in accordance with cancellation of the first trigger message includes one or more of cancellation of a task or reserved task based on the first trigger message, cancellation of connection to a network based on the first trigger message, and cancellation of data transmission to a network based on the first trigger message.

7. The method according to claim 4, wherein the cancellation information message is transmitted to the user equipment in the case that the first trigger message is successfully delivered to the user equipment, the first trigger message is transmitted to the user equipment regardless of successful delivery of the first trigger message to the user equipment, or the first trigger message is successfully delivered to the user equipment or the network node does not know whether the first trigger message has been transmitted to the user equipment but successfully delivered to the user equipment.

8. The method according to claim 1, wherein, if the first trigger message is pending in the network node or has been transmitted to the user equipment but not delivered to the user equipment successfully and the cancellation request indicates the replace request, the cancellation request is considered as success and a new trigger message is transmitted to the user equipment.

9. The method according to claim 1, wherein, if the first trigger message is pending in the network node or has been transmitted to the user equipment but not delivered to the user equipment successfully and the cancellation request indicates the recall request, the cancellation request is considered as success.

10. The method according to claim 1, wherein the network node is a machine type communication-interworking function (MTC-IWF) or a short message service-service center (SMS-SC).

11. A network node device for cancelling a device trigger in a wireless communication system, the network node device comprising:
- a transceiver; and
- a processor,
- wherein the processor is configured to:
  - control the transceiver to receive, from a services capability service/application server (SCS/AS), a cancellation request of a first trigger message,
  - check whether the first trigger message has been transmitted to a user equipment or is pending in the network node, and
  - control the transceiver to transmit a second trigger message to the user equipment if the cancellation request indicates a replace request,
- wherein if the first trigger message has been transmitted to the user equipment, the second trigger message includes cancellation information,
- wherein if the transmission of the first trigger message from the network node to the user equipment is canceled by the network node based on the cancellation request of the first trigger message from the SCS/AS or if the first trigger message is pending in the network node, the second trigger message does not include cancellation information, and
- wherein the cancellation information indicates that operation of the first trigger message has been canceled by the cancellation request of the SCS/AS.

* * * * *